United States Patent
Amini et al.

(10) Patent No.: US 8,804,495 B2
(45) Date of Patent: Aug. 12, 2014

(54) CARRIER SENSE MULTIPLE ACCESS (CSMA) FOR MULTIPLE USER, MULTIPLE ACCESS, AND/OR MIMO WIRELESS COMMUNICATIONS

(75) Inventors: Peiman Amini, Mountain View, CA (US); Matthew James Fischer, Mountain View, CA (US); Vinko Erceg, Cardiff by the Sea, CA (US); Joonsuk Kim, San Jose, CA (US); Joseph Paul Lauer, North Reading, MA (US)

(73) Assignee: Broadcom Corporation, Irvine, CA (US)

( * ) Notice: Subject to any disclaimer, the term of this patent is extended or adjusted under 35 U.S.C. 154(b) by 471 days.

(21) Appl. No.: 12/816,352

(22) Filed: Jun. 15, 2010

(65) Prior Publication Data

US 2010/0309779 A1    Dec. 9, 2010

Related U.S. Application Data

(63) Continuation-in-part of application No. 12/794,707, filed on Jun. 4, 2010.

(60) Provisional application No. 61/186,980, filed on Jun. 15, 2009, provisional application No. 61/185,153, filed on Jun. 8, 2009, provisional application No. 61/184,420, filed on Jun. 5, 2009.

(51) Int. Cl.
*H04H 20/71* (2008.01)
*H04L 12/26* (2006.01)

(52) U.S. Cl.
USPC ........... 370/221; 370/312; 370/329; 370/338; 370/336

(58) Field of Classification Search
CPC ... H04H 20/71; H04L 12/26; H04W 74/0816; H04W 24/02; H04W 84/12
USPC ......... 370/221, 312, 338, 448, 445, 447, 334, 370/336, 329; 455/453, 434, 450
See application file for complete search history.

(56) References Cited

U.S. PATENT DOCUMENTS

| | | | |
|---|---|---|---|
| 2003/0053469 A1* | 3/2003 | Wentink | 370/412 |
| 2005/0073973 A1* | 4/2005 | Laroia et al. | 370/329 |
| 2006/0025150 A1* | 2/2006 | Kim et al. | 455/453 |
| 2007/0206628 A1* | 9/2007 | Nishio et al. | 370/445 |

FOREIGN PATENT DOCUMENTS

WO  WO2009/010906  *  1/2009  .................... 370/448

* cited by examiner

*Primary Examiner* — Jamal Javaid
(74) *Attorney, Agent, or Firm* — Garlick & Markison; Shayne X. Short

(57) ABSTRACT

Carrier sense multiple access (CSMA) for multiple user, multiple access, and/or MIMO wireless communications. In wireless communication systems that operate in supporting communications via one or more clusters, appropriate determination of when to begin making such transmissions on one or more clusters is made in accordance with intelligent carrier sense multiple access (CSMA) that may be performed in a number of different ways. In accordance with this, a cluster may be any combination composed of one or more channels among one or more bands. In supporting multi-cluster access, CSMA may be performed in selecting a primary cluster and performing backoff (e.g., countdown) thereon. After backoff is finished for the primary cluster, and the availability of one or more others clusters is checked, transmissions may be made using the available clusters. Alternatively, backoff may be made for each or multiple (a subset of) clusters or even individually for each respective cluster.

20 Claims, 25 Drawing Sheets

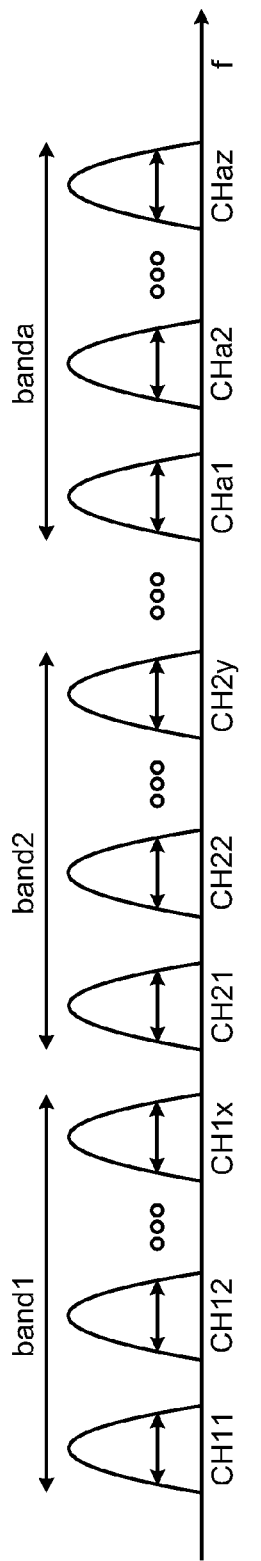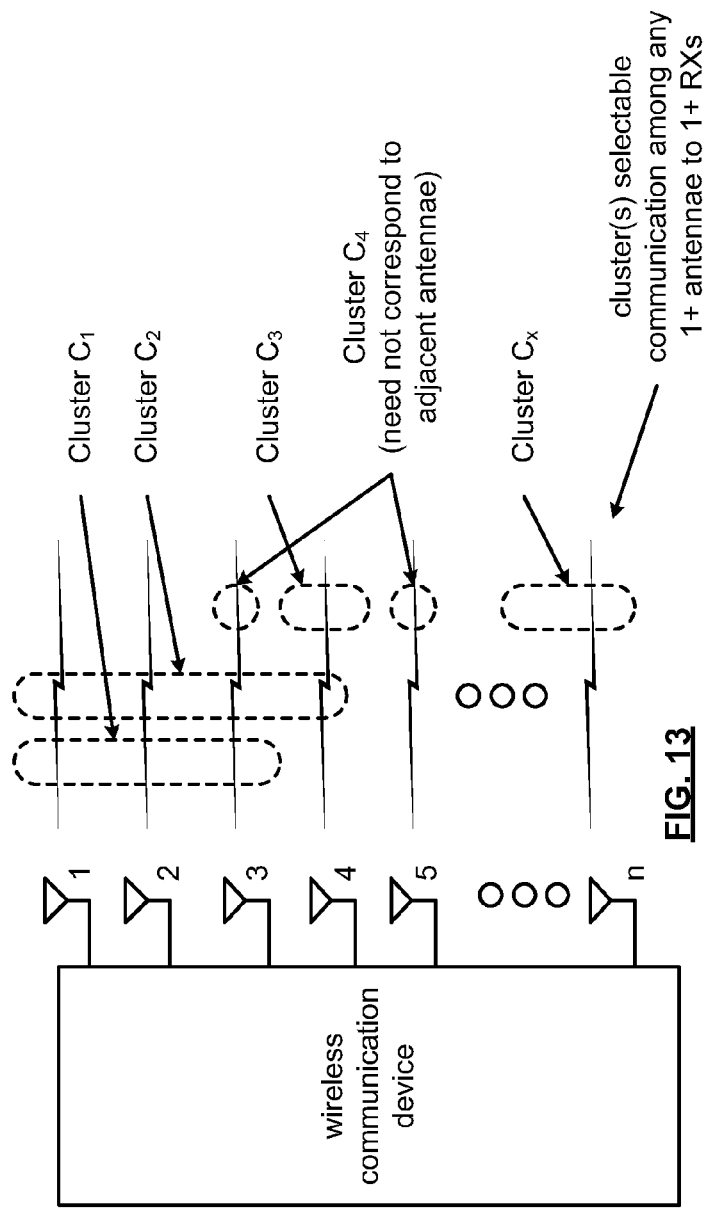
FIG. 13

FIG. 14   primary CSMA

FIG. 15    min-wait CSMA min-wait CSMA
(backoff restart)

FIG. 17    individual CSMA individual CSMA
(2 cluster wide transmission)

CARRIER SENSE MULTIPLE ACCESS (CSMA) FOR MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/186,980, entitled "Carrier sense multiple access for WLAN OFDM multiple access multi-user MIMO," filed Jun. 15, 2009, pending.

Continuation-in-Part (CIP) Priority Claim, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility patent application Ser. No. 12/794,707, entitled "Cluster parsing for signaling within multiple user, multiple access, and/or MIMO wireless communications," filed on Jun. 4, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
   a. U.S. Provisional Application Ser. No. 61/184,420, entitled "OFDMA cluster parsing and acknowledgement to OFDMA/MU-MIMO transmissions in WLAN device," filed Jun. 5, 2009, now expired.
   b. U.S. Provisional Application Ser. No. 61/185,153, entitled "OFDMA cluster parsing and acknowledgement to OFDMA/MU-MIMO transmissions in WLAN device," filed Jun. 8, 2009, now expired.

Incorporation by Reference

The following U.S. Utility Patent Application is hereby incorporated herein by reference in its entirety and is made part of the present U.S. Utility Patent Application for all purposes:

1. U.S. Utility patent application Ser. No. 12/794,711, entitled "Transmission acknowledgement within multiple user, multiple access, and/or MIMO wireless communications," filed concurrently with U.S. Utility patent application Ser. No. 12/794,707 on Jun. 4, 2010, pending, and also incorporated therein by reference.

The following IEEE standard is hereby incorporated herein by reference in its entirety and is made part of the present U.S. Utility Patent Application for all purposes:

1. IEEE 802.11-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1232 pages.

BACKGROUND OF THE INVENTION

1. Technical Field of the Invention

The invention relates generally to communication systems; and, more particularly, it relates to carrier sense multiple access for multiple user, multiple access, and/or MIMO wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 13 is a diagram illustrating an embodiment of a wireless communication device, and clusters, as may be employed for supporting communications with at least one additional wireless communication device.

DETAILED DESCRIPTION OF THE INVENTION

Figure 1:
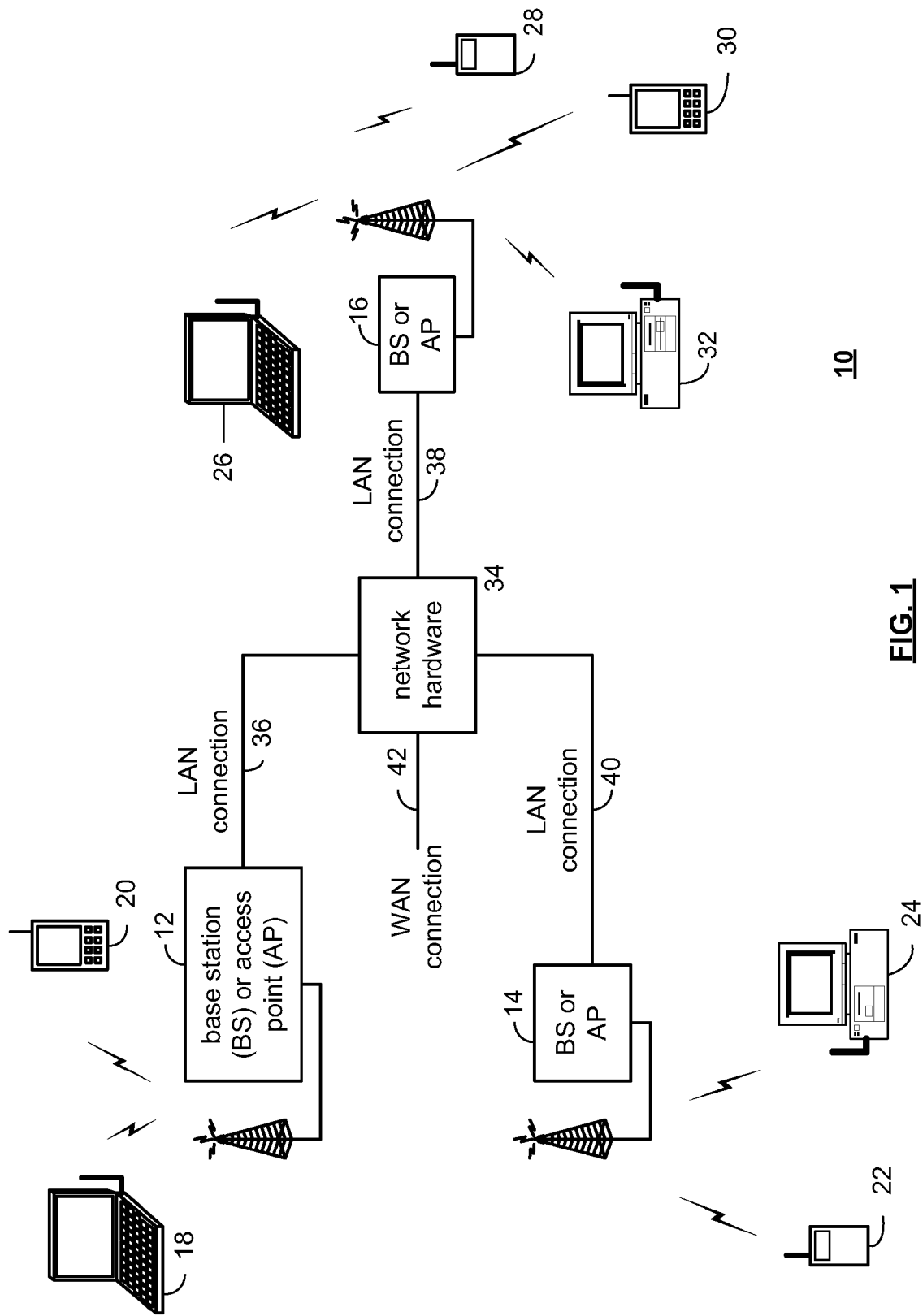
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication device may operate in accordance with the various aspects of the invention as presented herein to enhance performance, reduce costs, reduce size, and/or enhance broadband applications.

Figure 2:
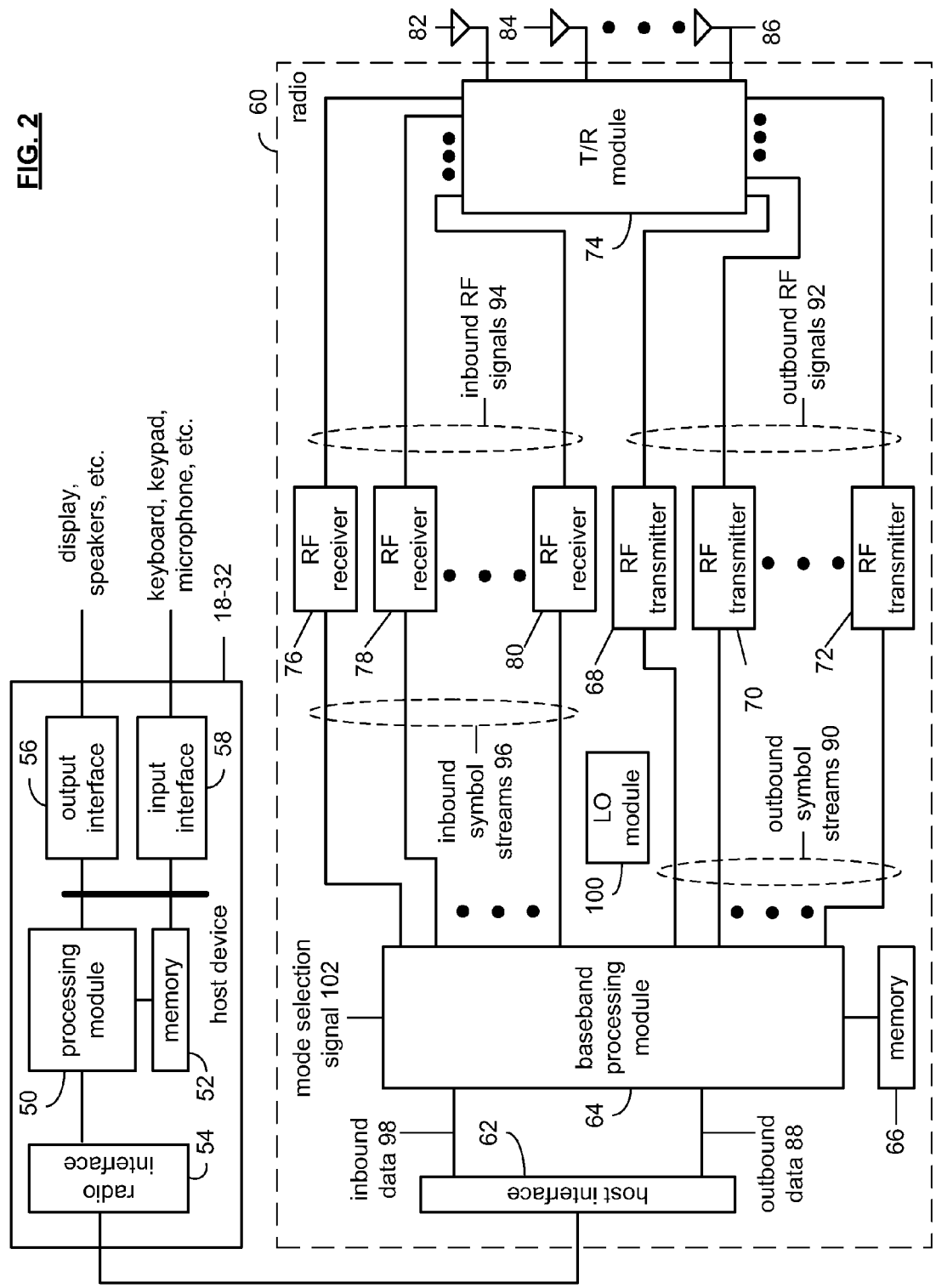
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96.

The number of inbound symbol streams 96 will correspond to the particular mode in which the data was received (recall that the mode may be any one of the modes illustrated in tables 1-12). The baseband processing module 60 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
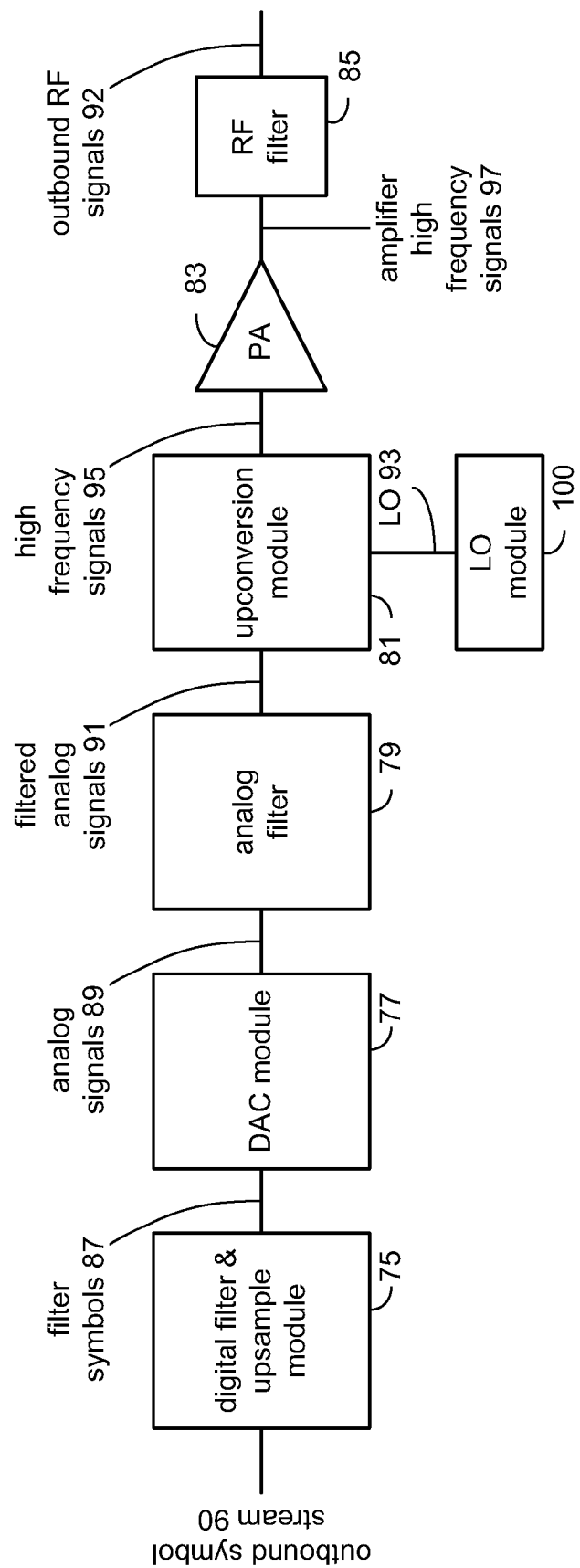
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
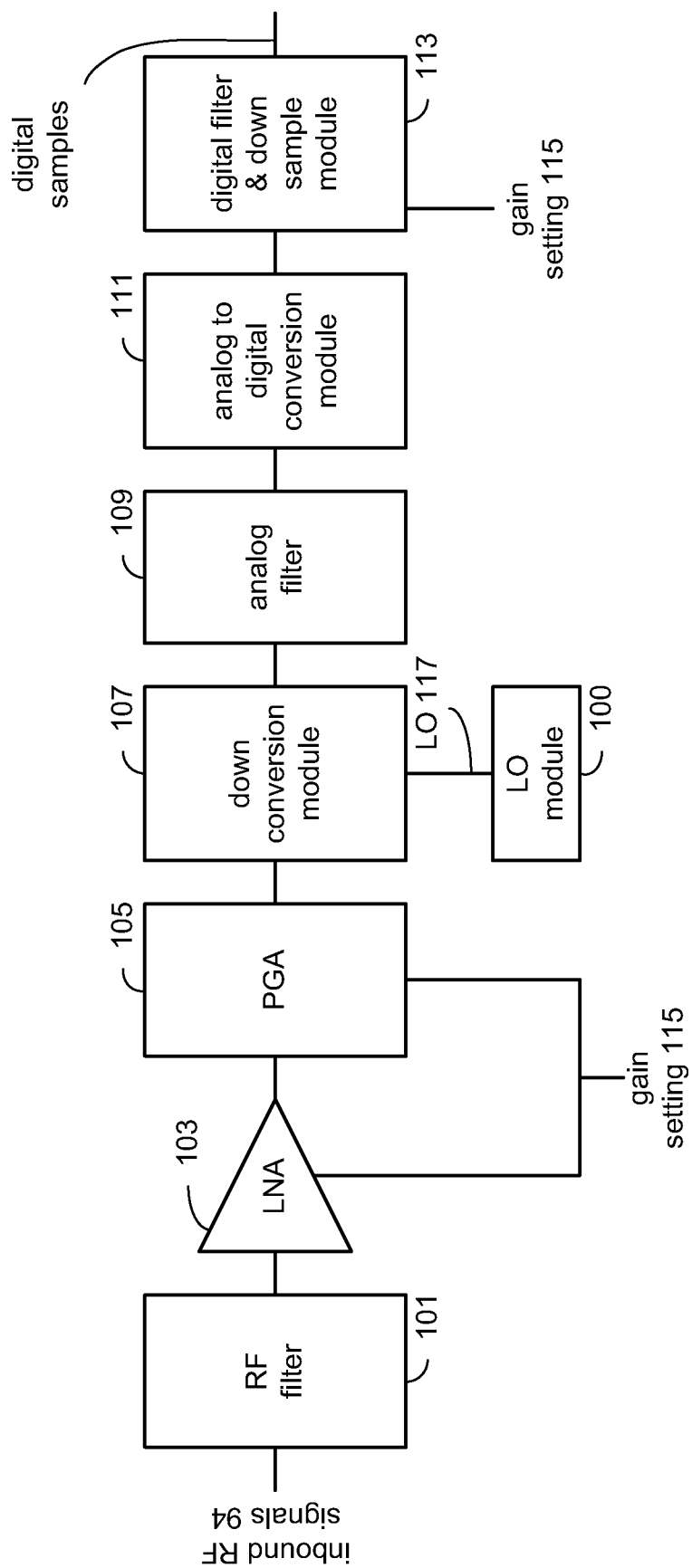
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
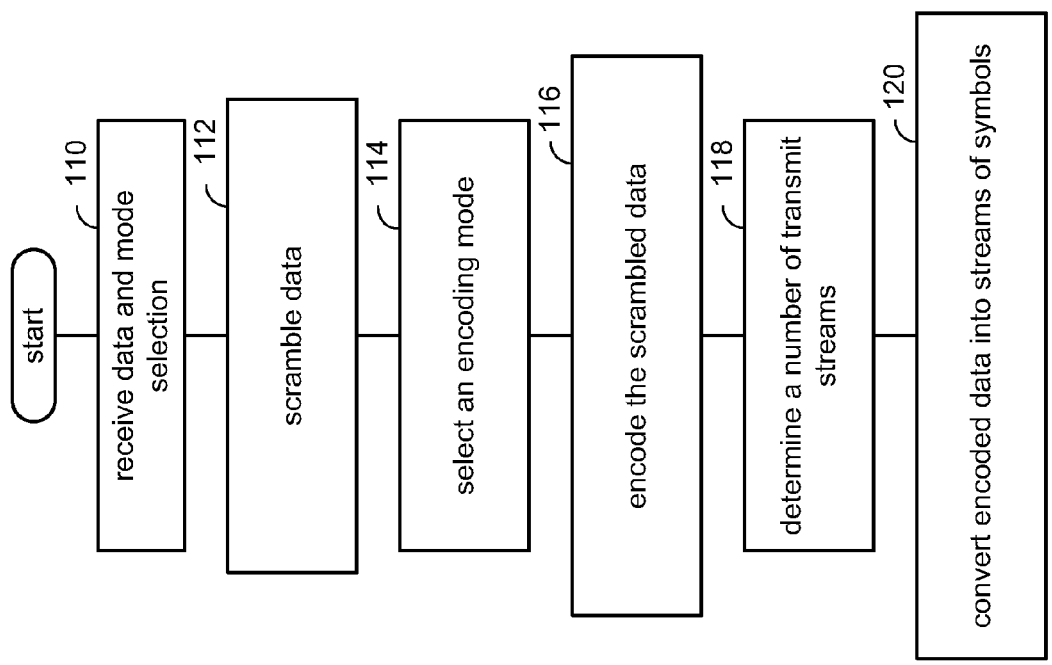
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
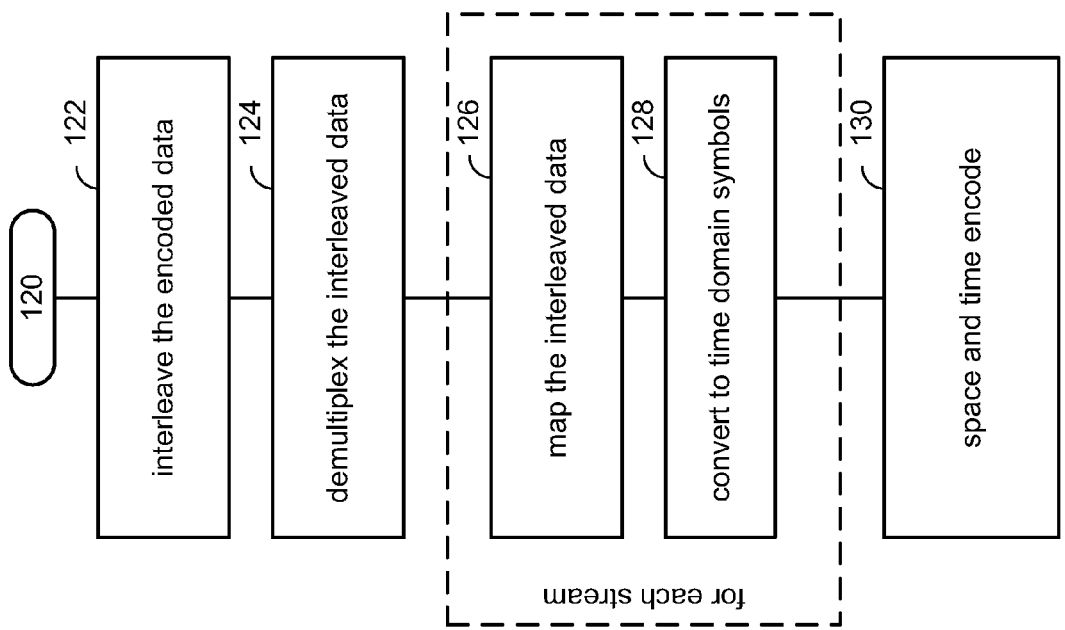
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n)), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} c_1 & c_2 & c_3 & c_4 & \cdots & c_{2M-1} & c_{2M} \\ -c_2^* & c_1^* & -c_4^* & c_3^* & \cdots & -c_{2M}^* & c_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
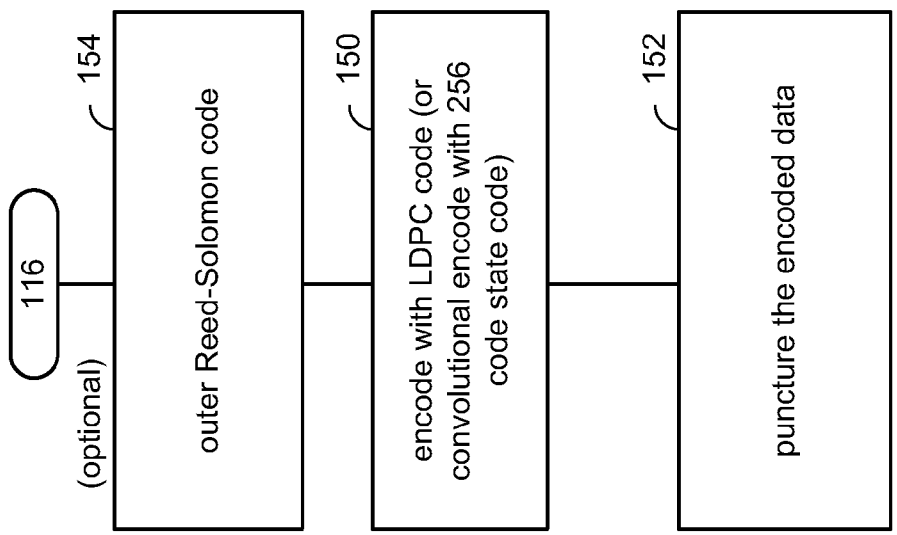
FIGS. 7-9 are diagrams illustrating various embodiments for encoding the scrambled data.
Figure 8:
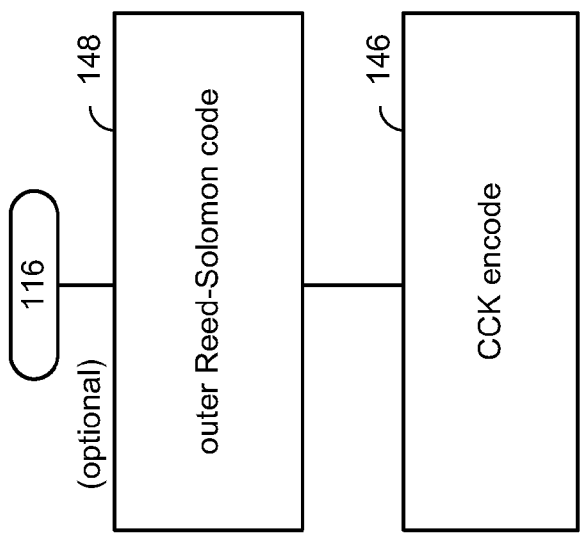
Figure 7:
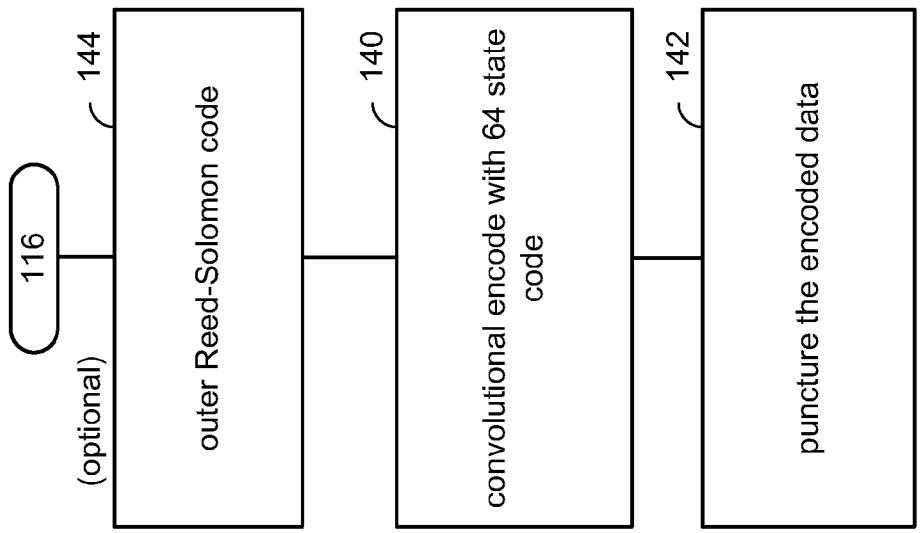

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
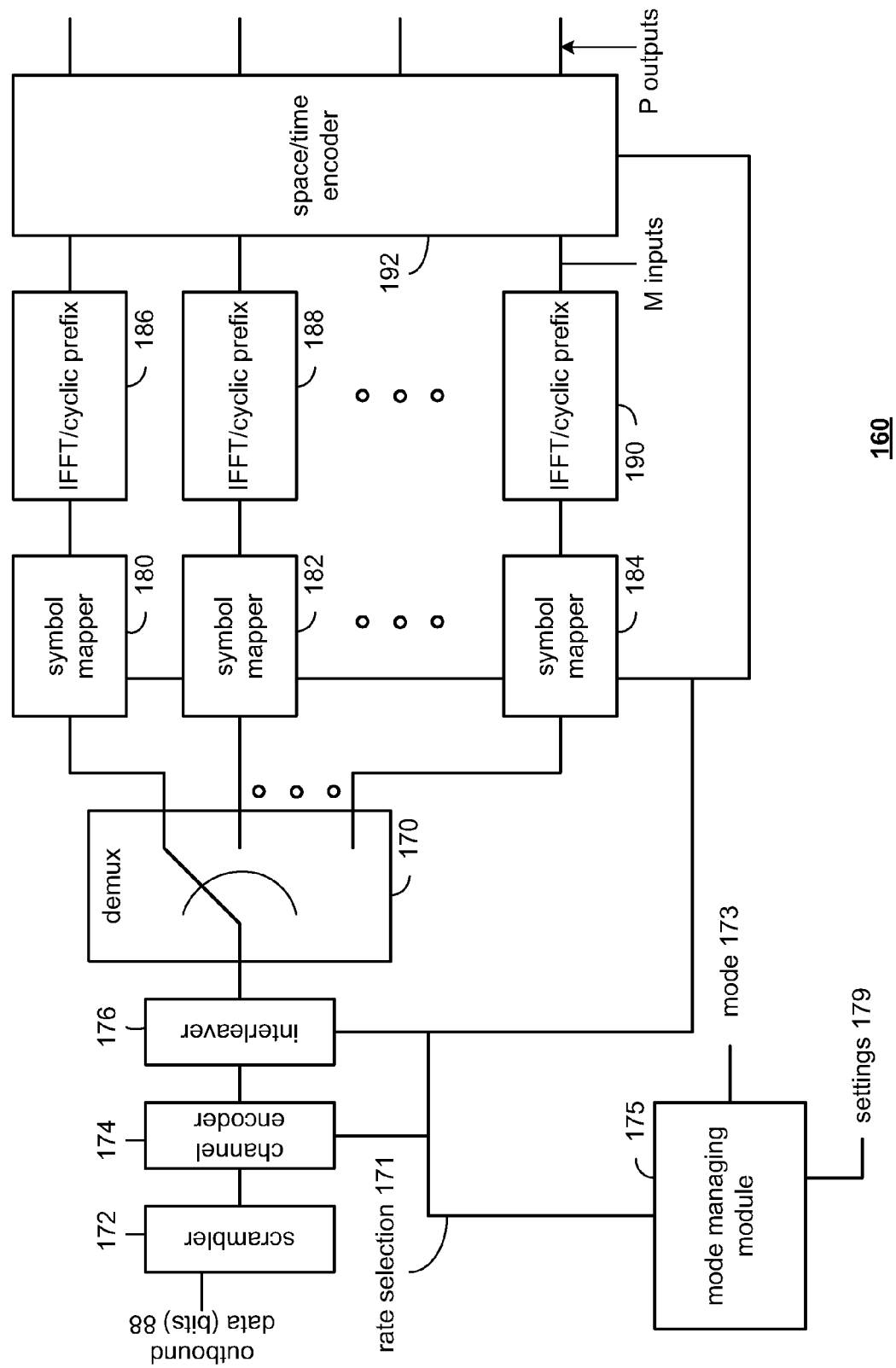
FIGS. 10A and 10B are diagrams illustrating embodiments of a radio transmitter.
Figure 10B:
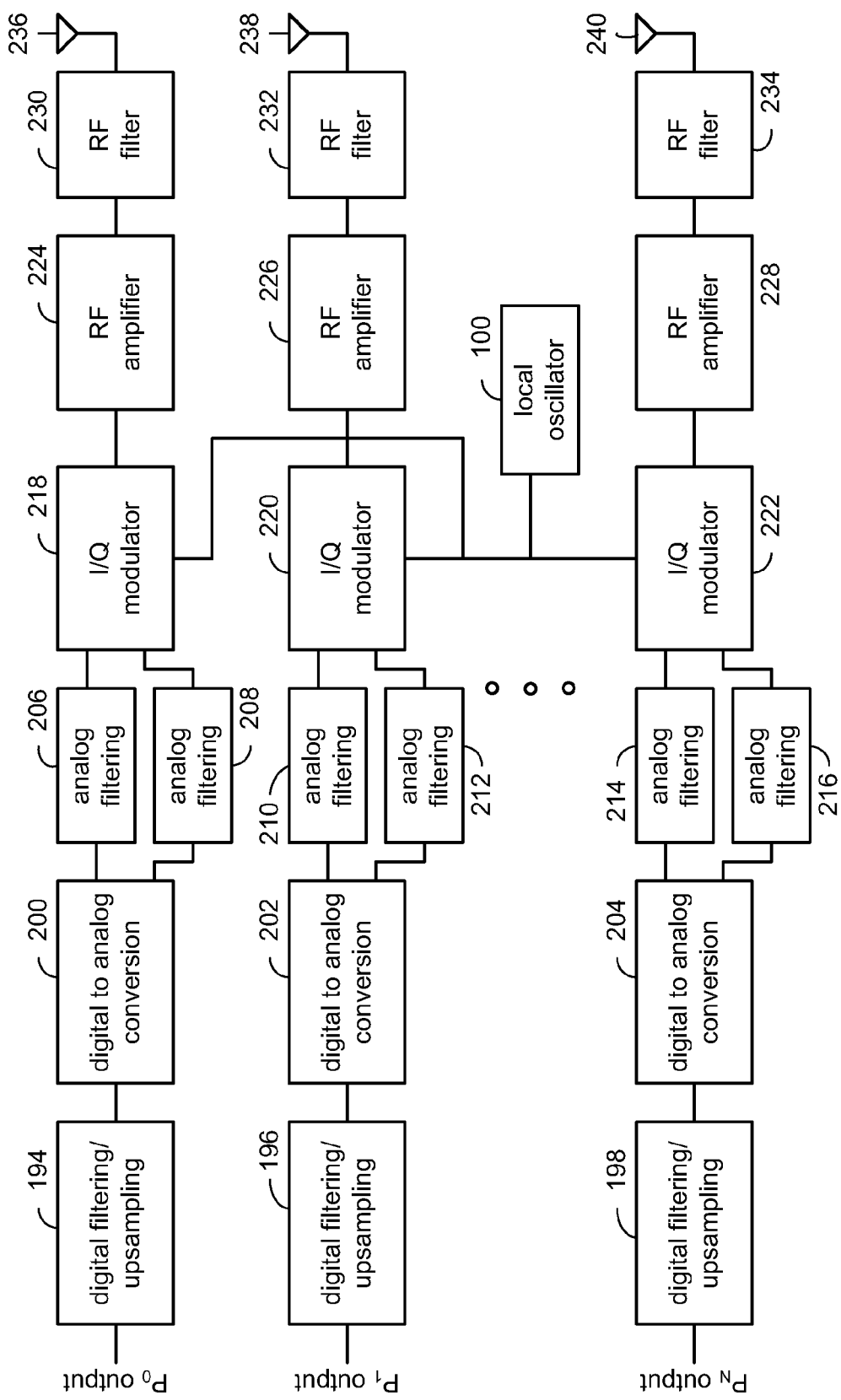

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleave 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \cdots & C_{2M-1} & C_{2M} \\ -C_2^* & C_1^* & -C_4^* & C_3^* & \cdots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
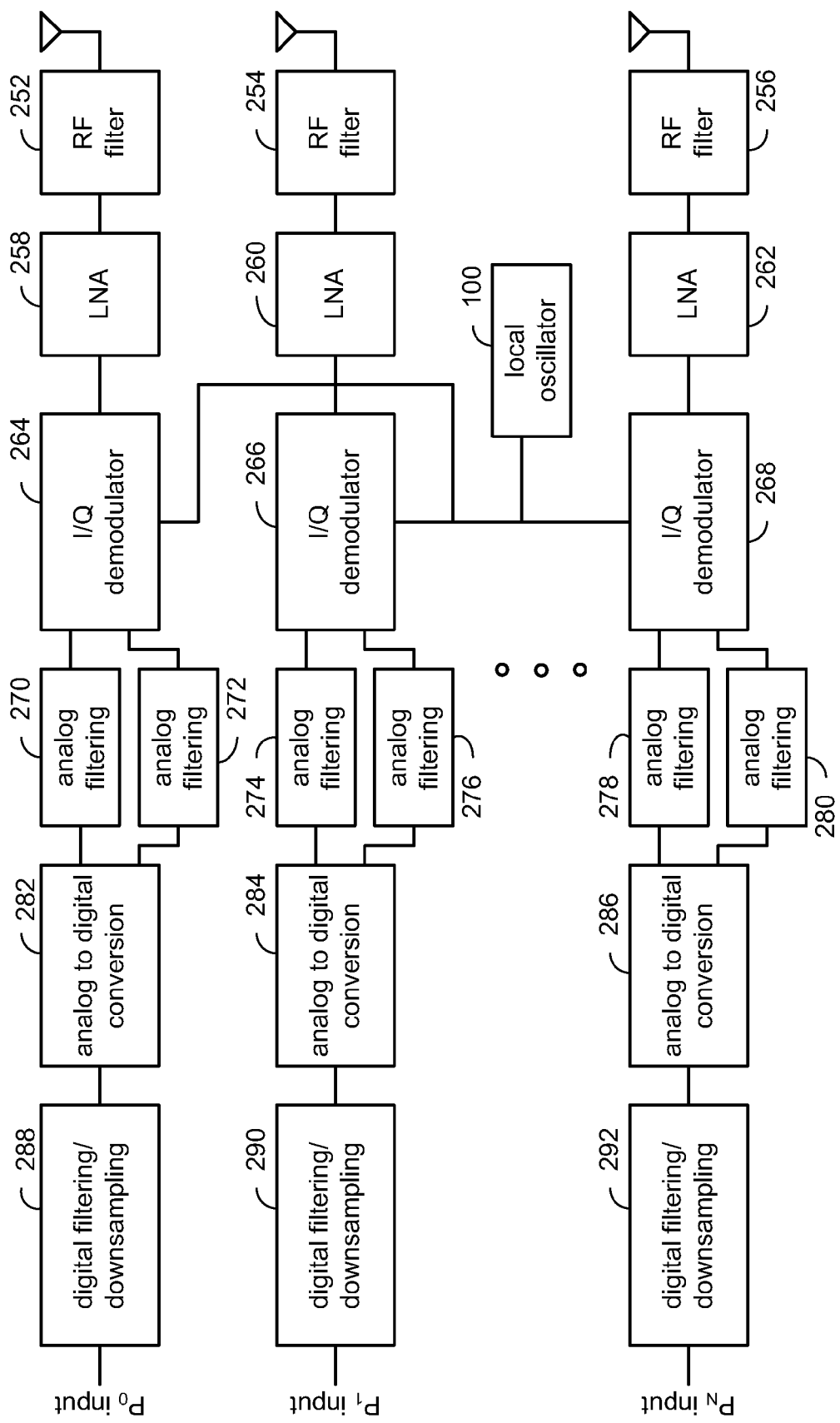
FIGS. 11A and 11B are diagrams illustrating embodiments of a radio receiver.
Figure 11B:
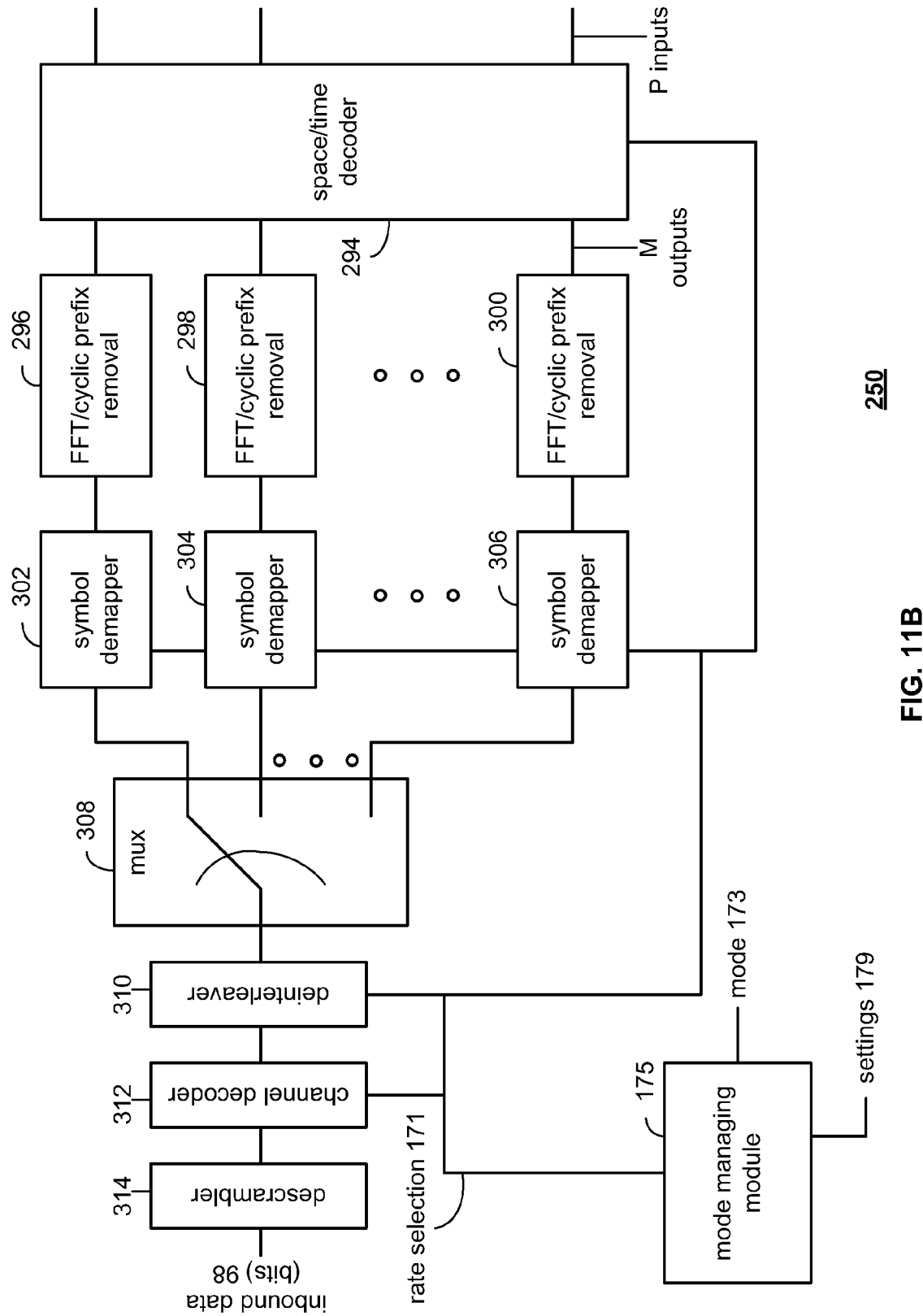

FIGS. 11A and 11B are diagrams illustrating embodiments of a radio receiver. These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-260, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-260 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
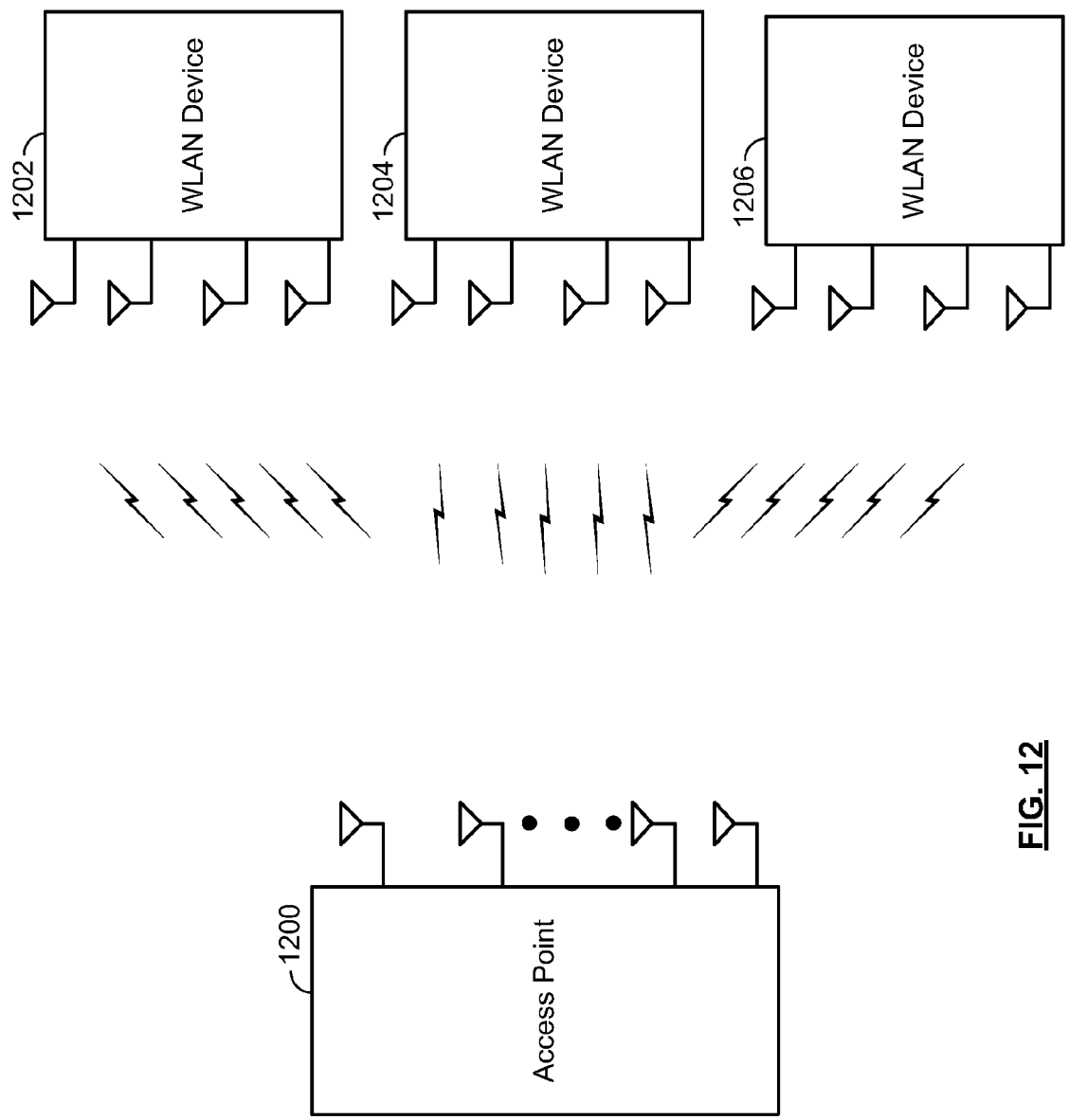
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Various means and approaches are presented herein, and equivalents, for starting transmissions from a transmitting wireless communication device via multiple clusters to one or more receiving wireless communication devices. For example, when multiple clusters are available for transmitting one or more signals between wireless communication devices, appropriate analysis and handling of activity on the various clusters in managed to coordinate when any one of the wireless communication devices is to make a transmission. The various means and approaches are presented herein, and equivalents, may be applied to multi-cluster CSMA communications systems of N clusters (where N is an integer). For example, one approach operates in accordance with primary cluster CSMA such that one of the N clusters is chosen as a primary cluster, and backoff is performed thereon, based on the medium condition of the primary cluster, for determining access to the communication medium.

Another approach operates in accordance with min-wait CSMA such that backoff is selected and counted down on each of the several (e.g., all N) clusters based on the activity on the respective clusters and each cluster becomes ready for communication access after satisfying its individual backoff condition. Yet another based on the medium condition of the primary cluster individual CSMA such that medium access on each of the several (e.g., all N) clusters is based on the communication medium activity of only that cluster. It is also noted that the various approaches presented herein may also be applied to communication system embodiments in which multiple users may occupy the same or different cluster/channel (e.g., the multi-user (MU) aspect of a MU-MIMO and/or OFDMA communication system).

Figure 14:
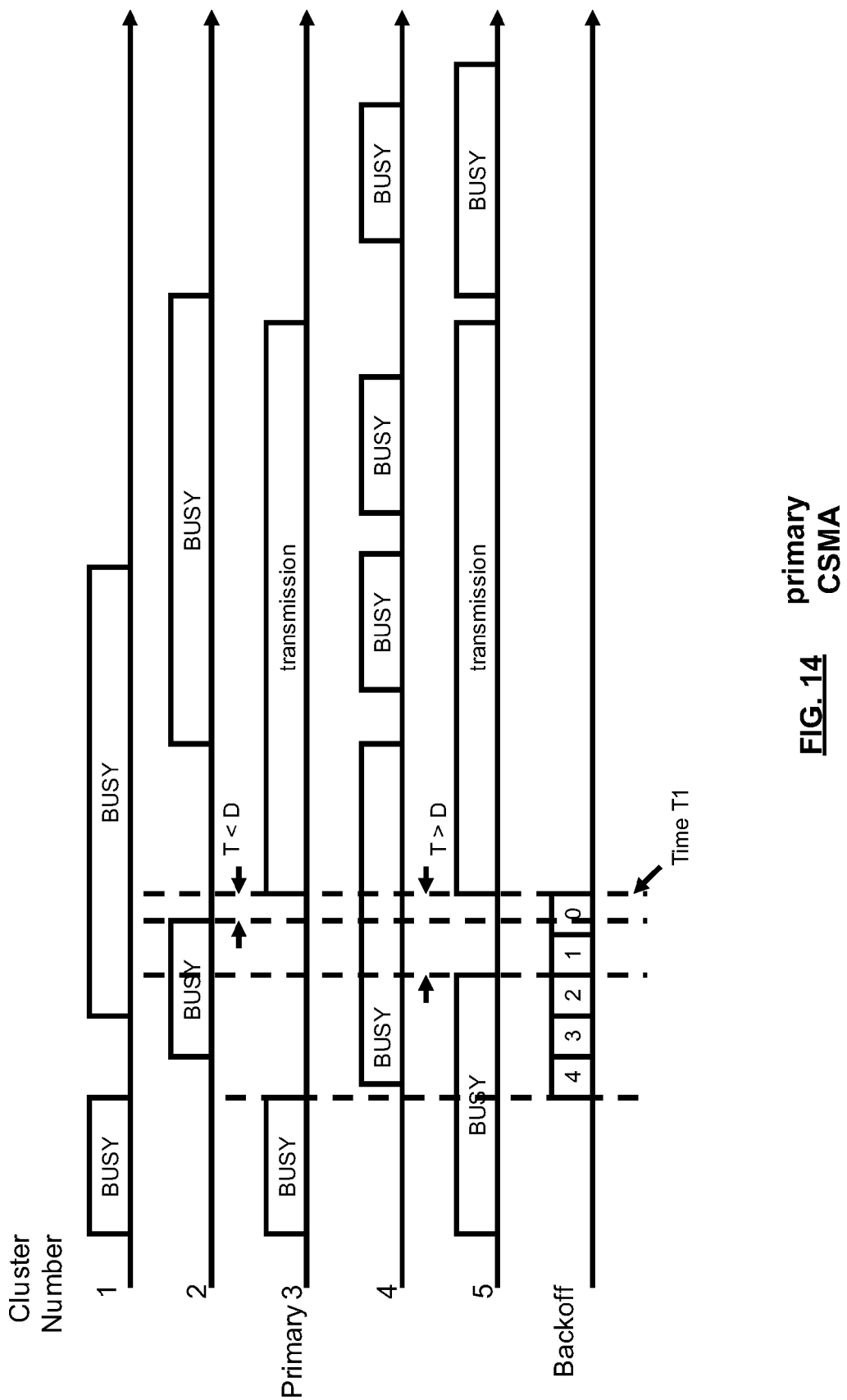
FIG. 14 is a diagram illustrating an embodiment of performing primary cluster carrier sense multiple access (CSMA).

FIG. 14 is a diagram illustrating an embodiment of performing primary cluster carrier sense multiple access (CSMA). In accordance with this primary cluster CSMA, access to more than one cluster is achieved by performing backoff (i.e., a delay of transmission) based on the medium condition of one cluster selected from among the several clusters to be employed for transmission of a signal. For example, one of the clusters is selected as a primary cluster, and a backoff is performed with respect to the medium condition of that primary cluster. Once the primary cluster is detected as being idle (e.g., free of activity of any traffic corresponding to communications to or from any wireless communication devices within the communication system), a backoff start count is computed from which a backoff is executed. The backoff start count may be computed using a random value generator. From the backoff start count, the backoff counts down (counts backwards) until the backoff reaches zero (indicating backoff is complete). Therefore, multi-cluster access to the communication medium is determined by selecting a single backoff corresponding to the primary cluster (a selected one of the clusters), and then once the backoff is completed, the communication medium condition of the total number of clusters (e.g., X clusters, where X is an integer) is then monitored at that point to determine if there is any activity on those X clusters.

The backoff is counted down (starting from the computed backoff start count) based on the condition of a primary cluster (e.g., when it is determined as being idle). In some instances, the backoff may be started immediately when the primary cluster medium condition is detected as being idle. This selection of which cluster among the X clusters is to be the primary cluster may be chosen by the transmitting wireless communication device or another wireless communication device (e.g., AP). Such a transmitting wireless communication device may be a MU-MIMO/OFDMA capable transmitting wireless communication device.

With respect to the primary cluster, when its corresponding backoff reaches zero (e.g., the backoff completes counting down to zero), the medium condition of the remaining clusters on which communications are desired to be supported are then checked (e.g., if X clusters are desired for the transmission, then the X−1 additional clusters beyond the primary cluster are checked once the backoff for the primary cluster is completed). It is noted that the communication channel and the transmitting wireless communication device may be operative to support communications using more clusters than the X clusters currently under consideration. Stated another way, the X clusters may be a subset of N total available clusters available, where N is an integer.

Once the backoff corresponding to the primary cluster is complete, then the transmission may begin on the primary cluster. In an alternative embodiment, consideration may be made of both the backoff corresponding to the primary cluster being complete and at least one additional cluster being determined as available for transmission. In such a case, the transmission may then begin on the primary cluster only or on the primary cluster plurality at least one of the additional clusters that is available. Once the backoff corresponding to the primary cluster is complete, and at least one additional cluster is determined as being available for transmission, then the transmission may begin. The transmission may be made on the primary cluster only, or the transmission may be made on the primary cluster plus any of the remaining X−1 clusters for which the medium condition is found to be idle. It is noted that any subset of the available clusters (the primary cluster plus any of the remaining X−1 clusters for which the medium condition is found to be idle) may be employed for the transmission. In other words, any one or more of the available clusters may be employed for a given transmission.

If desired, another constraint may be employed such that the primary cluster and any of the remaining X−1 clusters for which the medium condition is found to be idle must be required to be idle for a period of time (e.g., time D). This period of time, D, may be a predetermined period of time such as a fixed amount of "look-back" time applicable for more than one cluster. Alternatively, different clusters may have different respective "look-back" times (e.g., D1 for cluster 1, D2 for cluster 2, D3 for cluster 3, etc.). Also, D may also have different values depending on the characteristics of the respective cluster, frequency of operation, etc.

Also, yet another constraint maybe that there must be a minimum number of clusters, F, that must be available for transmission (e.g., the total number of clusters composed of the primary cluster plus those of the remaining X−1 clusters for which the medium condition is found to be idle must be greater than some minimum value, F). This minimum value, F, may be a fixed value, or it may be adaptively determined as a function of current operating conditions of the wireless communication device itself or the communication system in which the wireless communication device operates. In other words, F may be a first value at a first time, and F may be a second value at a second time.

When the backoff for the primary cluster is complete, and at that time, if the medium condition of F of the X−1 additional clusters is determined as not being idle (e.g., the minimum number of available clusters is not met at that time), then a new value of backoff may be chosen for the primary cluster, and the backoff may then be restarted. This process may continue until the conditions are met for performing a transmission. After the transmission is complete, a new backoff start count may be computed for the primary cluster.

Also, subsequent to the start of a transmission, if the medium condition of any one or more of the clusters that was not idle for a respective period of time (e.g., a required time D) at the start of the transmission then becomes idle during the transmission itself (e.g., within the constraint of the required time D), then that one or more additional clusters may be then added to the group and used for the transmission. For example, the transmitting wireless communication device may then start transmitting on the newly available one or more clusters in addition to the currently used clusters being used for the transmission. In other words, these newly available clusters may be included for use in transmission in addition to the currently used clusters (e.g., the primary plus any of the X−1 additional clusters currently being used).

Referring to the diagram, of the 5 clusters of interest (e.g., clusters 1, 2, 3, 4, and 5), the primary cluster is selected as being cluster 3, and the non-primary clusters are then 1, 2, 4, and 5. Again, it is noted that there may be more than 5 clusters available for use in transmission by the transmitting wireless communication device, but this group of 5 clusters is the group of interest. After computing a backoff start count, backoff is counted down on primary cluster medium condition based on the condition thereof (e.g., beginning when the cluster is detected as being idle). Referring to the diagram, once cluster 3 is determined as being idle, and after the backoff is completed, then at time T1, transmission may commence on the primary cluster 3 and on cluster 5. As can be seen, once the backoff for the primary cluster 3 is complete, only the primary cluster 3 and non-primary cluster 5 have been idle for the minimum required time (D). As such, the transmission can begin on the clusters 3, 5. It is noted that this total number of two available clusters (e.g., clusters 3, 5) is greater than or equal to the minimum number of clusters, F, that are required for supporting such a transmission.

Within this embodiment and any other embodiments described herein, it is noted that the transmissions being made via whichever one or more clusters are selected may be made in accordance with any configuration of the one or more antennae of the transmitting wireless communication device. As described with reference to the previous diagram, different clusters may be transmitted via different groups of one or more antennae. Also, it is noted that a given cluster may be associated with different one or more antennae at different times.

From certain perspectives, an apparatus (e.g., a wireless communication device) that includes a baseband processing module and a plurality of antennae may be operative to support and perform functionality associated with this embodiment and others described herein. Several examples of an apparatus may be described with reference to FIG. 1, FIG. 2, etc. For example, the plurality of antennae within such an apparatus are implemented for supporting communication with at least one wireless communication device, and the baseband processing module is implemented to perform various operations such as determining whether a cluster is idle or active, computing and performing backoffs, directing and controlling the initiation of transmission of one or more signals via one or more the plurality of antennae using one or more of the clusters, etc.

For example, with respect one embodiment of an apparatus performing operations corresponding this diagram, such a baseband processing module may be implemented for computing a backoff start count for performing backoff for a first of a plurality of clusters when the first of the plurality of clusters detected as being idle. Then, when the backoff corresponding to the first of the plurality of clusters being completed, baseband processing module may operate by determining whether the first and a second of the plurality of clusters being idle. When the first and the second of the plurality of clusters are determined as being idle, the apparatus employs at least one of the plurality of antennae transmitting at least one signal to the at least one additional wireless communication device using at least one of the first and the second of the plurality of clusters. Such an apparatus including a baseband processing module and the plurality of antennae may also be implemented to effectuate functionality and operations of other embodiments as described elsewhere herein.

Figure 15:
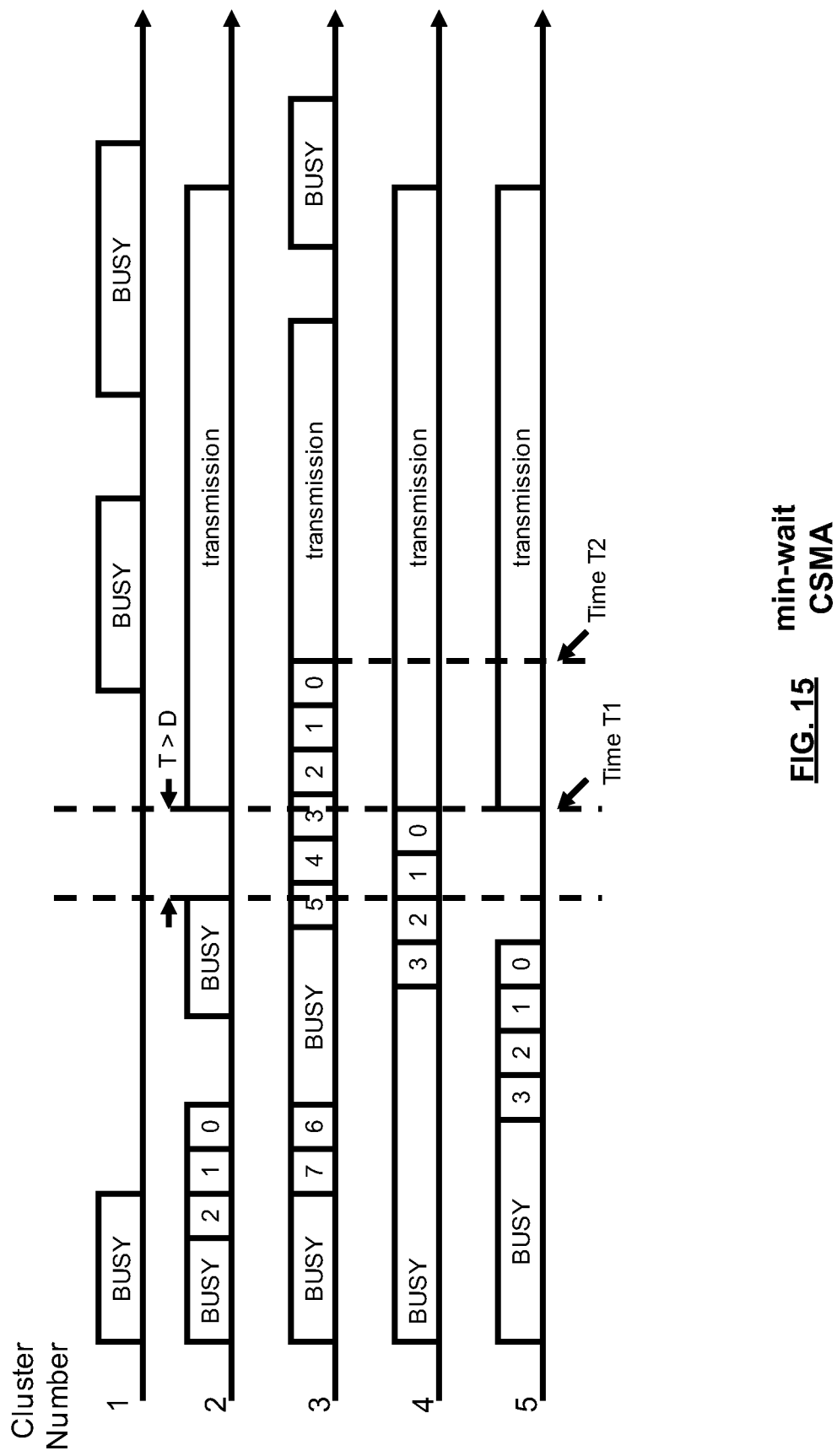
FIG. 15 is a diagram illustrating an embodiment of performing min-wait CSMA.

FIG. 15 is a diagram illustrating an embodiment of performing min-wait CSMA. Within this embodiment, backoff is computed and performed for each of the respective clusters (e.g., a number of X clusters) on which the transmitting STA desires to transmit. These X clusters may be a subset of the total number of available clusters or may include all of the available clusters. In this diagram, backoff for each cluster is counted based on the medium condition for that cluster. Once the medium condition for a respective cluster is available (idle), the backoff may begin for that respective cluster. When backoff is completed (e.g., reaches zero) for a respective cluster, backoff is not then restarted, but the medium condition for that cluster is monitored to determine any activity. Alternatively, in an embodiment performing restarting of backoff, after the backoff for a cluster has reached zero, if the medium indication for that cluster becomes not idle (e.g., becomes active), then a new backoff number may be computed or chosen for that cluster, and a new backoff may be performed to count down again when the cluster again is detected as being idle. However, depending on a desired implementation, restarting of backoff when a cluster becomes not idle (e.g., becomes active or busy) need not necessarily be performed. In a preferred embodiment, backoff is not restarted in accordance with min-wait CSMA when the cluster becomes not idle (e.g., becomes active or busy).

After backoff has been completed for each of the respective clusters (of course, each backoff for each respective cluster beginning when that respective cluster being idle), when at least a minimum number of clusters (e.g., using F of X clusters as employed in other embodiments) has reached a backoff of zero, and the medium on all F of those clusters is detected as being idle, then transmission on any subset (e.g., any one or more) of those clusters that have reached a backoff of zero may begin. Analogously as within other embodiments, another constraint may be employed such that each of these clusters for which the medium condition is found to be idle must be required to be idle for a period of time (e.g., time D). This period of time, D, may be a predetermined period of time such as a fixed amount of "look-back" time applicable for more than one cluster. Also, different clusters may have different respective "look-back" times (e.g., D1 for cluster 1, D2 for cluster 2, D3 for cluster 3, etc.). Alternatively, D may also have different values depending on the characteristics of the respective cluster, frequency of operation, etc. After the transmission is complete, a new backoff start count may be computed for each respective cluster on which a transmission was sent.

As within other embodiments, subsequent to the start of a transmission, if the medium condition of any one or more of the clusters that was not idle for a respective period of time (e.g., a required time D) at the start of the transmission then becomes idle during the transmission itself (e.g., within the constraint of the required time D), then that one or more additional clusters may be then added to the group and used for the transmission. For example, the transmitting wireless communication device may then start transmitting on the newly available one or more clusters in addition to the currently used clusters being used for the transmission. In other words, these newly available clusters may be included for use in transmission in addition to the currently used clusters (e.g., in addition to the clusters being used for the current transmission on the initially determined idle clusters).

Referring to the diagram, backoff is computed and counted down based on the medium condition of the multiple clusters. If, after the backoff is completed, the medium indication for that cluster becomes not idle (e.g., becomes active), then backoff need not be restarted, but the medium condition for that cluster or set of clusters is monitored. For example, this embodiment depicts clusters 1, 2, 3, 4, and 5, but a set of clusters, X, is composed of a subset thereof (e.g., the set X is composed of clusters 1, 2, 3, and 4). As stated above, when backoff is completed (e.g., reaches zero) for a respective cluster, backoff is not then restarted, but the medium condition for that cluster is monitored. In some embodiments, the transmission can begin when at least a minimum number of clusters (e.g., using F of X clusters) have completed backoff and are detected as being idle. In this embodiment, F may be selected as being 3 (as opposed to 2 in a previous embodiment). As can be seen in the diagram, at time T1, the transmission may commence using clusters 2, 4, and 5. At time T2, the transmission may also include cluster 3 in addition to the initially employed clusters 2, 4, and 5. For example, cluster 3 is not available when the transmission begins at time T1 on the clusters 2, 4, and 5, yet becomes available after the transmission has begun. The cluster 3 then can be added for use in supporting the transmission.

Figure 16:
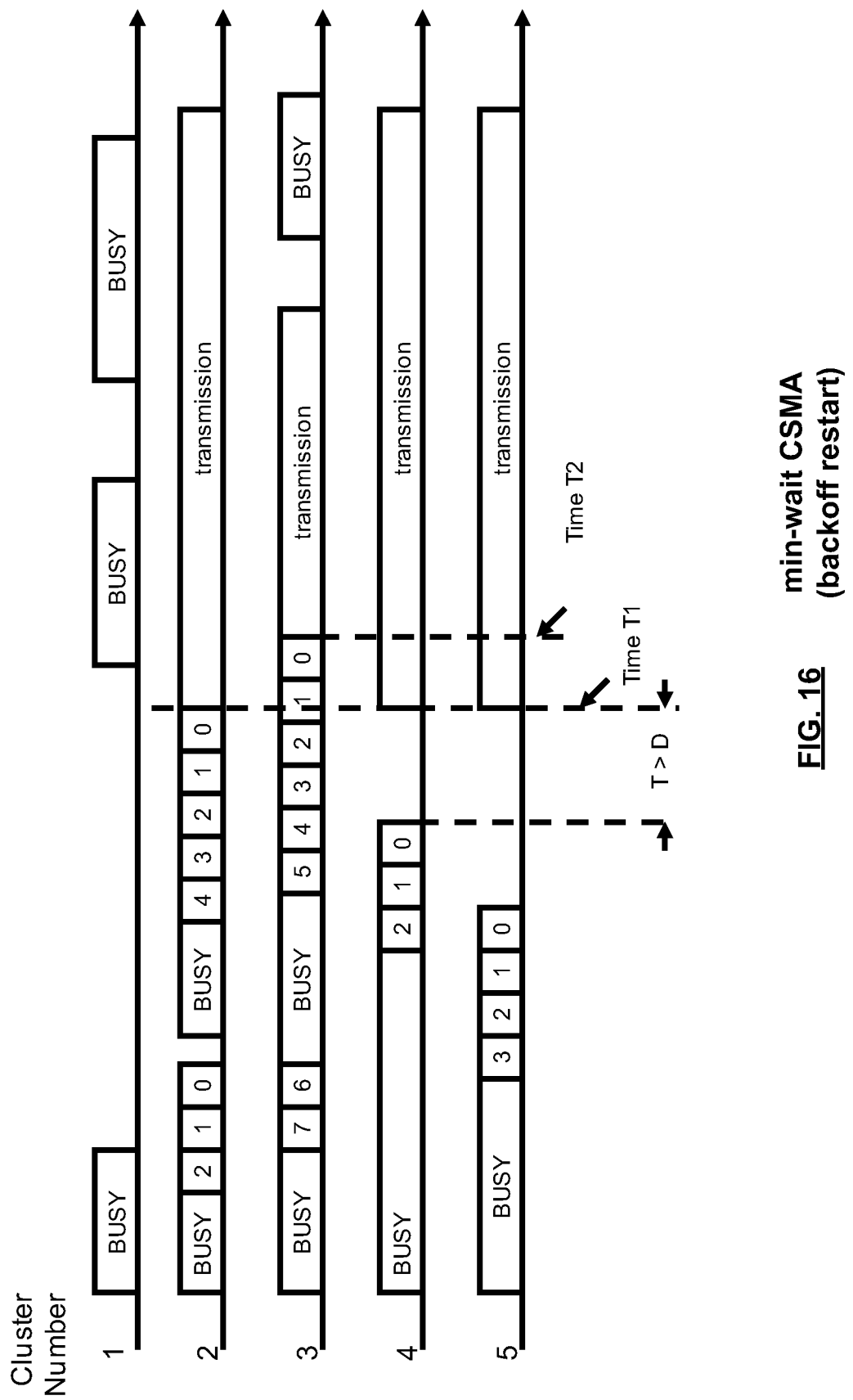
FIG. 16 is a diagram illustrating an embodiment of performing min-wait CSMA with backoff restart.

FIG. 16 is a diagram illustrating an embodiment of performing min-wait CSMA with backoff restart. This diagram has some similarities to the previous embodiment, in that backoff is computed and counted down based on the medium condition of multiple clusters. In this embodiment, if the medium indication for a given cluster becomes not idle (e.g., becomes active and unavailable) when the backoff count for that cluster is at zero and no transmission is occurring, then a new backoff number may be computed and counted down for that particular cluster. This embodiment may be viewed as being less efficient than the previous embodiment, yet may be preferable in certain implementations (e.g., those operating in accordance with medium access fairness considerations).

Figure 17:
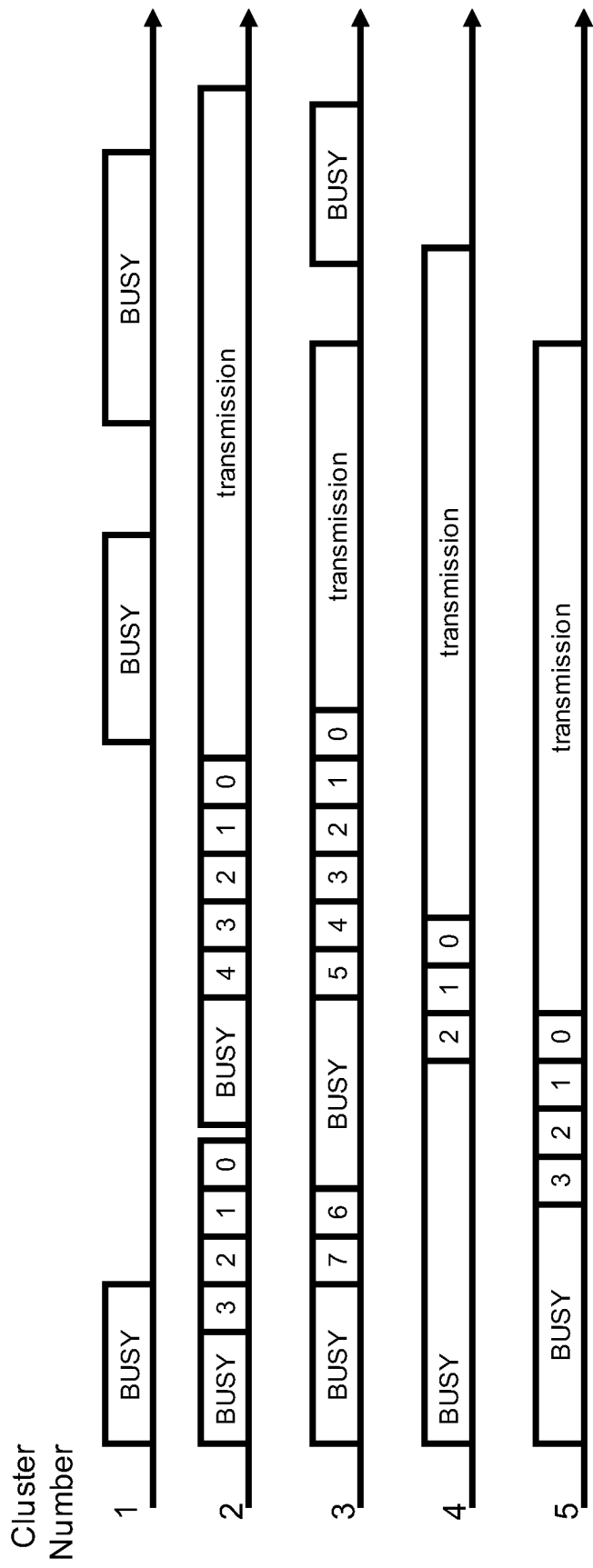
FIG. 17 is a diagram illustrating an embodiment of performing CSMA individually with respect to clusters.

FIG. 17 is a diagram illustrating an embodiment of performing CSMA individually with respect to clusters. In such an embodiment, backoff is computed and performed for each cluster of a set of clusters (e.g., a set of clusters including X clusters, X being an integer) on which a transmission is desired to be performed. This set of X clusters need not be all of the available clusters. For example, the set of X clusters or a total available number of N clusters may be selected (N being an integer), and backoff is computed and performed respectively for each of those clusters of interest. In such an embodiment, each respective backoff is counted down based on the medium indication for only that respective cluster, counting down whenever that cluster's medium condition is detected as being idle.

For each cluster Y within the set of X clusters (among the total number of N available clusters, where X=N in some embodiments), when the backoff indication for a respective cluster Y within the group of X clusters has counted down to zero and the medium condition is detected as being idle, and when a signal (e.g., frame, packet, etc.) is waiting for transmission, then transmission thereof may begin on the respective cluster Y.

When transmission is allowed on more than one cluster at the same time, then the transmitting wireless communication device transmitter may transmit a signal (e.g., frame, packet, etc.) that occupies more than one cluster at a time. A further constraint may require that all of those clusters must indicate a backoff value of zero and also have been indicating a respective medium condition of idle for some period of time (e.g., D). As within other embodiments, this period of time, D, may be a predetermined period of time such as a fixed amount of "look-back" time applicable for more than one cluster. Alternatively, different clusters may have different respective "look-back" times (e.g., D1 for cluster 1, D2 for cluster 2, D3 for cluster 3, etc.). Also, D may also have different values depending on the characteristics of the respective cluster, frequency of operation, etc. After the transmission is complete, a new backoff start count may be computed for each respective cluster on which a transmission was sent.

Again, as within other embodiments, subsequent to the start of a transmission, if the medium condition of any one or more of the clusters that was not idle for a respective period of time (e.g., a required time D) at the start of the transmission then becomes idle during the transmission itself (e.g., within the constraint of the required time D), then that one or more additional clusters may be then added to the group and used for the transmission. For example, the transmitting wireless communication device may then start transmitting on the newly available one or more clusters in addition to the currently used clusters being used for the transmission. In other words, these newly available clusters may be included for use in transmission in addition to the currently used clusters (e.g., in addition to the clusters being used for the current transmission on the initially determined idle clusters).

Figure 18:
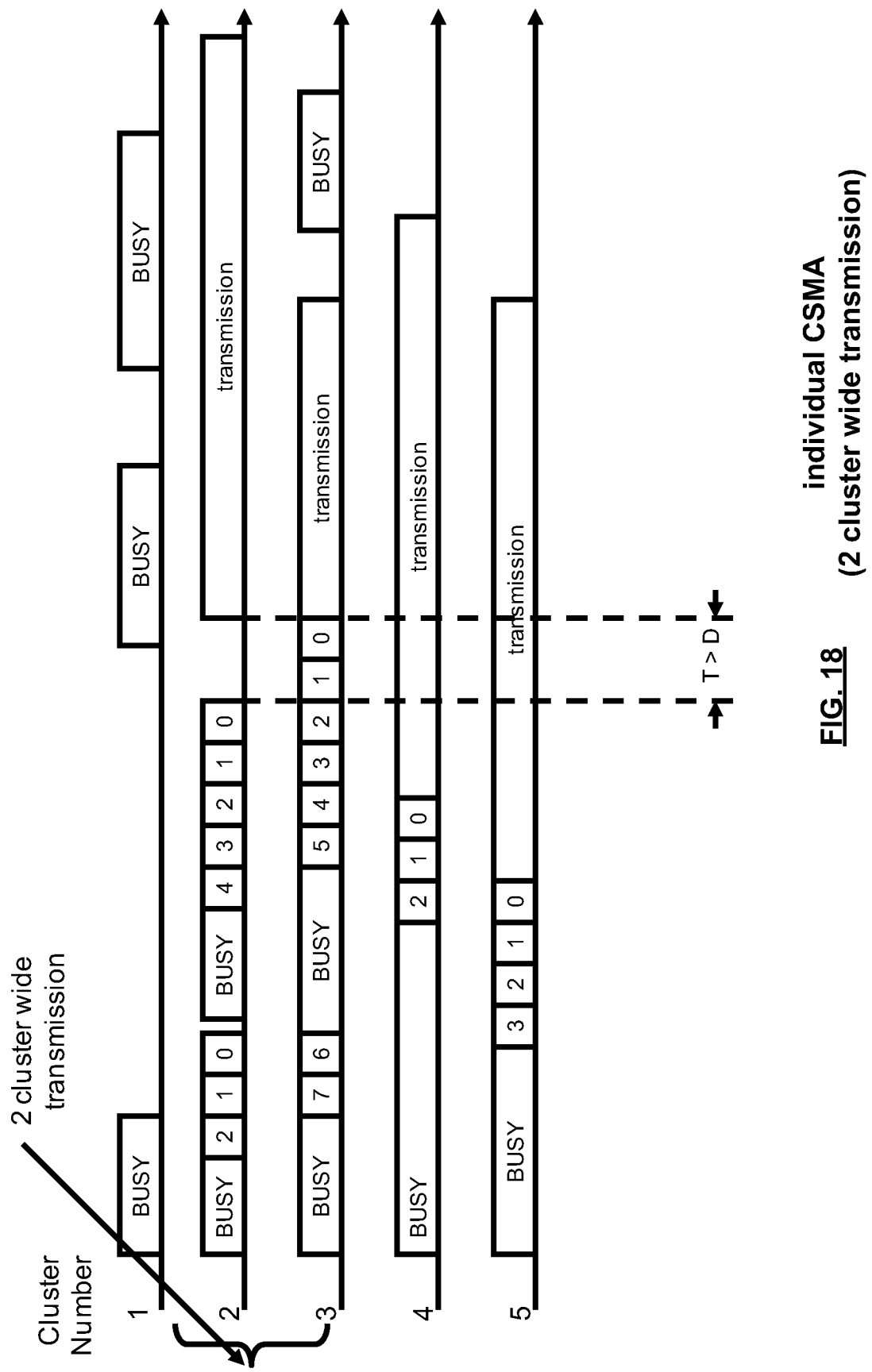
FIG. 18 is a diagram illustrating an embodiment of performing CSMA individually with respect to clusters and then performing transmission via more than one cluster.

FIG. 18 is a diagram illustrating an embodiment of performing CSMA individually with respect to clusters and then performing transmission via more than one cluster. This diagram has some similarities to the previous embodiment, with at least one difference being that the transmission is desired to be performed using more than one clusters (e.g., two adjacent clusters 2 and 3). Of course, when desiring to perform a transmission using more than one cluster, such clusters need not be adjacent (e.g., they can be separated from one another). In this embodiment, the transmission begins once backoff has been computed, performed, and completed on each of the two clusters and also once both of these two clusters are idle. In this diagram, after its respective backoff is complete, cluster 2 is idle for a period of time before the respective backoff of cluster 3 is complete.

FIG. 19, FIG. 20, FIG. 21, FIG. 22, FIG. 23, FIG. 24, and FIG. 25 are diagrams illustrating various embodiments of methods for operating one or more wireless communication devices.

The various methods presented herein operate initially by determining whether there is a frame to be transmitted, and if so, then proceeding to examine the medium condition for the cluster on which the frame is to be transmitted. If the cluster condition indicates that a frame may be transmitted, then the transmission on that cluster may begin. Generally speaking, the cluster condition comprises the medium state for that cluster and the backoff count value for that cluster (e.g., the backoff start count). Generally speaking, a frame may be transmitted on a cluster if the medium condition for that cluster is idle and the backoff count for that cluster is zero (e.g., such as has counted down to zero). For alternative embodiments, this general principle may be modified in a number of ways. In a preferred embodiment, for example, a backoff count condition for a specific cluster does not exist and instead, the backoff count value for the primary is used by the other clusters when examining a backoff count value for the purpose of determining if a transmission may proceed on that non-primary cluster.

Figure 19:
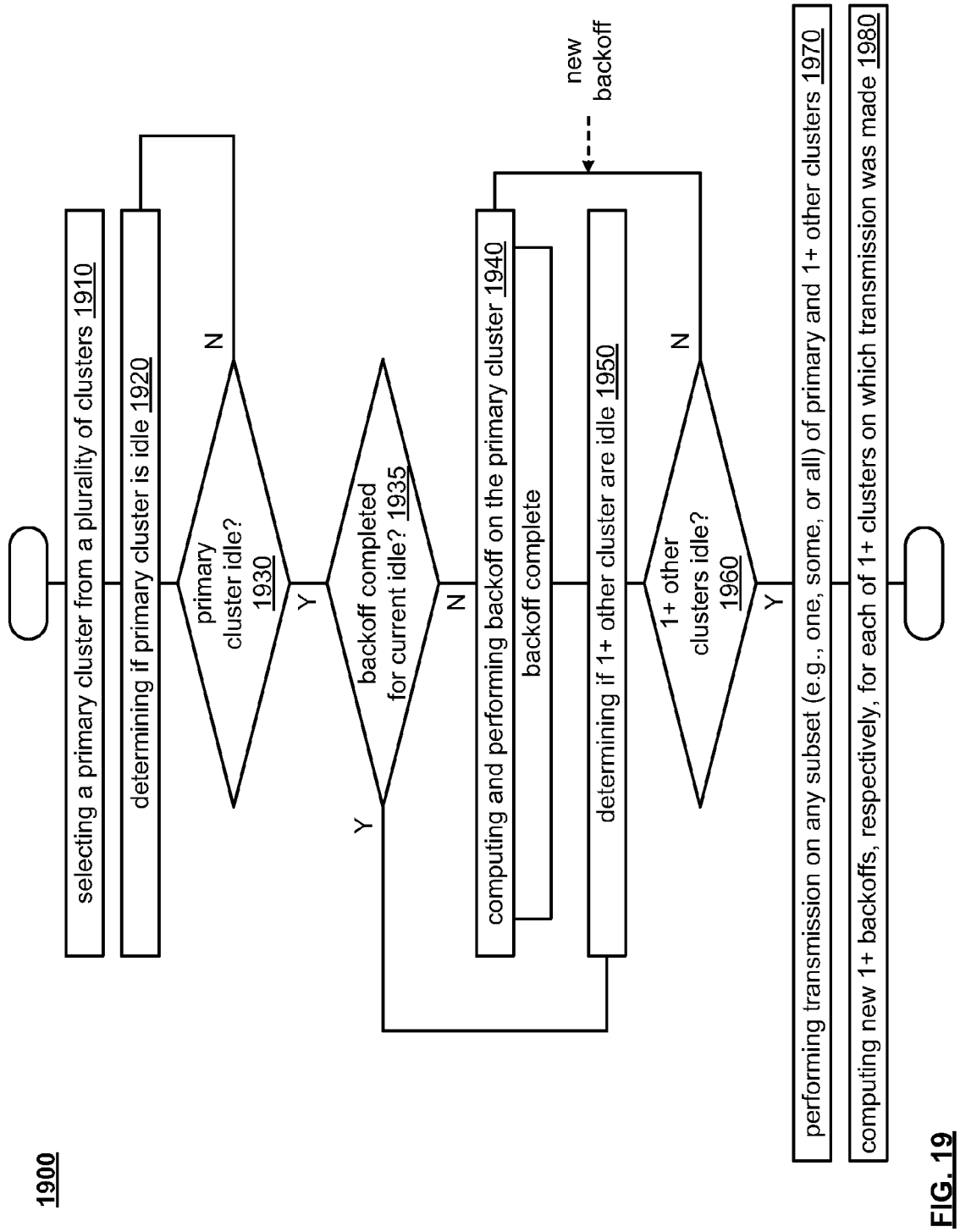
FIG. 19, FIG. 20, FIG. 21, FIG. 22, FIG. 23, FIG. 24, and FIG. 25 are diagrams illustrating various embodiments of methods for operating one or more wireless communication devices.

Referring to method 1900 of FIG. 19, the method 1900 begins by selecting a primary cluster from a plurality of clusters, as shown in a block 1910. There may be a total number of clusters available for use within a wireless communication device, and any desired subset (e.g., all of the clusters, a subset composed of fewer than all of the clusters, etc.) may be selected for consideration. From among these clusters, one of them is selected as being a primary cluster at block 1910. The method 1900 continues by determining if the primary cluster is idle, as shown in block 1920. As determined by the decision block 1930, if the primary cluster is not idle, then the method 1900 continues operations in accordance with block 1920.

Alternatively, as determined by the decision block 1930, if the primary cluster is idle, then the method 1900 continues by examining the previous backoff condition at block 1935. If a previous backoff process has been executed since the last time that the medium made a transition from busy to idle and the backoff count value is currently 0, then the method 1900 proceeds to block 1950, otherwise, the method 1900 proceeds to block 1940. In block 1940, the method 1900 computes and performs backoff on the primary cluster. Once the backoff at block 1940 is complete (e.g., count is zero), the method 1900 then operates by determining if one or more of the other clusters are idle, as shown in a block 1950.

As determined by the decision block 1960, if none of the other cluster is idle, then the method continues operations in accordance with block 1940. This may involve calculating a new backoff start count for performing a subsequent backoff on the primary cluster.

As determined by the decision block 1960, if the other clusters are idle, then the method continues operations by performing transmission on any subset (e.g., one, some, or all) of primary and one or more other clusters, as shown in a block 1970.

After the transmission is complete, the method 1900 then operates by computing new backoffs, respectively, for each of the one or more clusters on which transmission was made, as shown in a block 1980.

From certain perspectives, the method 1900 is a variation of an embodiment for computing a backoff start count for performing backoff for a first of a plurality of clusters when the first of the plurality of clusters detected as being idle. Then, the backoff corresponding to the first of the plurality of clusters being completed, the operations continue by determining whether the first and a second of the plurality of clusters are idle. Then, when the first and the second of the plurality of clusters are determined as being idle, the operations continue by operating at least one of a plurality of antennae for transmitting at least one signal to at least one additional wireless communication device using at least one of the first and the second of the plurality of clusters.

Figure 20:
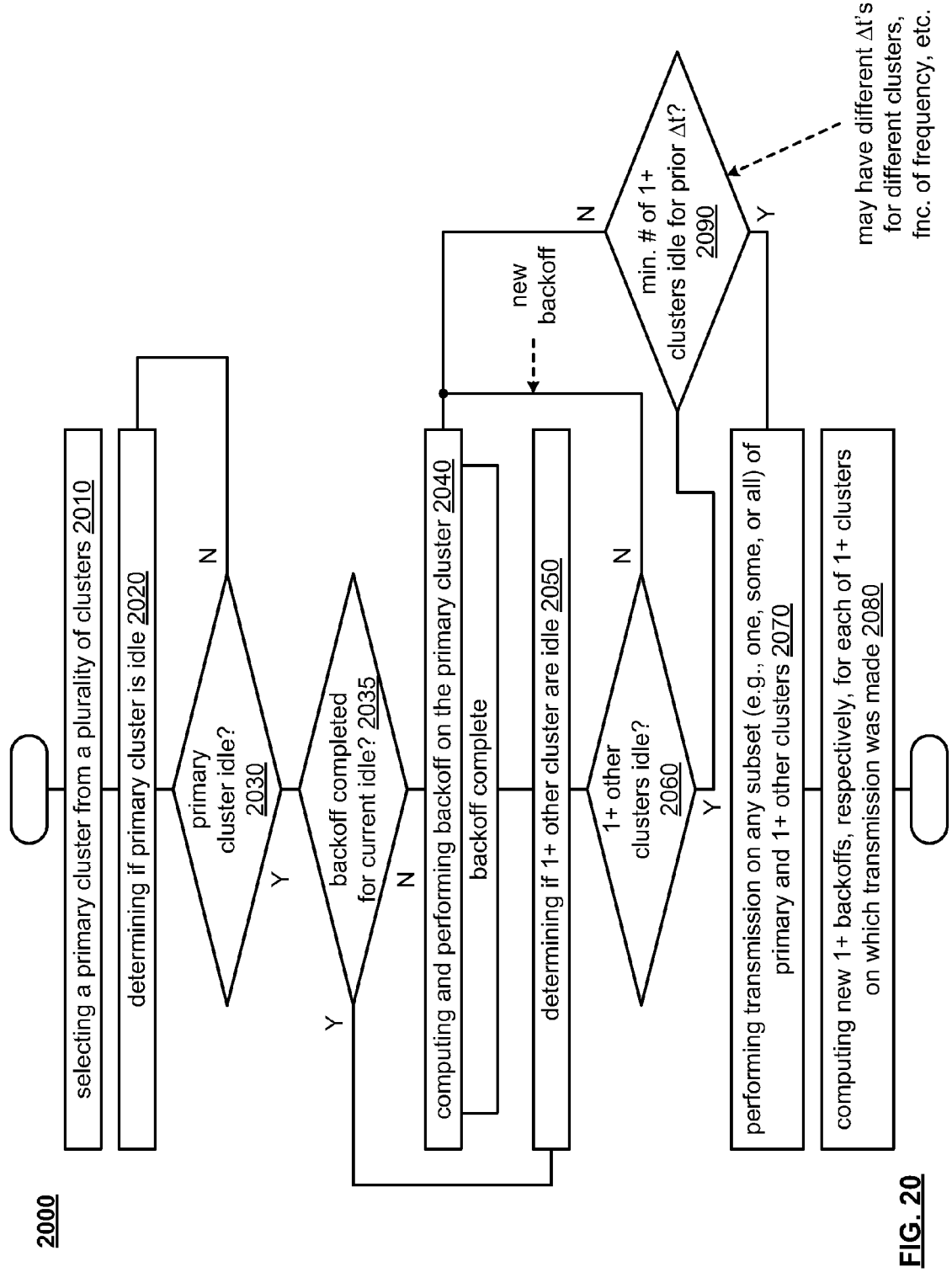

Referring to method 2000 of FIG. 20, the method 2000 has some similarities to the previous embodiment. The method 2000 begins by selecting a primary cluster from a plurality of clusters, as shown in a block 2010. As with the previous embodiment, there may be a total number of clusters available for use within a wireless communication device, and any desired subset (e.g., all of the clusters, a subset composed of fewer than all of the clusters, etc.) may be selected for consideration. From among these clusters, one of them is selected as being a primary cluster. The method 2000 continues by determining if primary cluster is idle, as shown in a block 2020. As determined by the decision block 2030, if the primary cluster is not idle, then the method 2000 continues operations in accordance with block 2020.

Alternatively, as determined by the decision block 2030, if the primary cluster is idle, then the method 2000 continues by examining the previous backoff condition at block 2035. If a previous backoff process has been executed since the last time that the medium made a transition from busy to idle and the backoff count value is currently 0, then the method 2000 proceeds to block 2050, otherwise, the method 2000 proceeds to block 2040. In block 2040, the method 2000 computes and performs backoff on the primary cluster. Once the backoff at block 2040 is complete (e.g., count is zero), the method 2000 then operates by determining if one or more of the other clusters are idle, as shown in a block 2050.

As determined by the decision block 2060, if none of the other cluster is idle, then the method continues operations in accordance with block 2040. This may involve calculating a new backoff start count for performing a subsequent backoff on the primary cluster.

As determined by the decision block 2060, if the other clusters are idle, then the method 2000 continues determining if a minimum number of clusters have been idle for requisite period or periods of time, as shown in a decision block 2090. For example, each of these clusters for which the medium condition is found to be idle must be required to be idle for a period of time (e.g., time D). This period of time, D, may be a predetermined period of time such as a fixed amount of "look-back" time applicable for more than one cluster. Also, different clusters may have different respective "look-back" times (e.g., D1 for cluster 1, D2 for cluster 2, D3 for cluster 3, etc.). Alternatively, D may also have different values depending on the characteristics of the respective cluster, frequency of operation, etc.

If a minimum number of clusters have not been idle for requisite period or periods of time, as shown in a decision block 2090, then the method 2000 continues operations in accordance with block 2040 (may involve calculating a new backoff start count).

Alternatively, if the minimum number of clusters has been idle for requisite period or periods of time, as shown in a decision block 2090, then the method 2000 continues operations by performing transmission on any subset (e.g., one, some, or all) of primary and one or more other clusters, as shown in a block 2070. After the transmission is complete, the method 2000 then operates by computing new backoffs, respectively, for each of the one or more clusters on which transmission was made, as shown in a block 2080.

Figure 21:
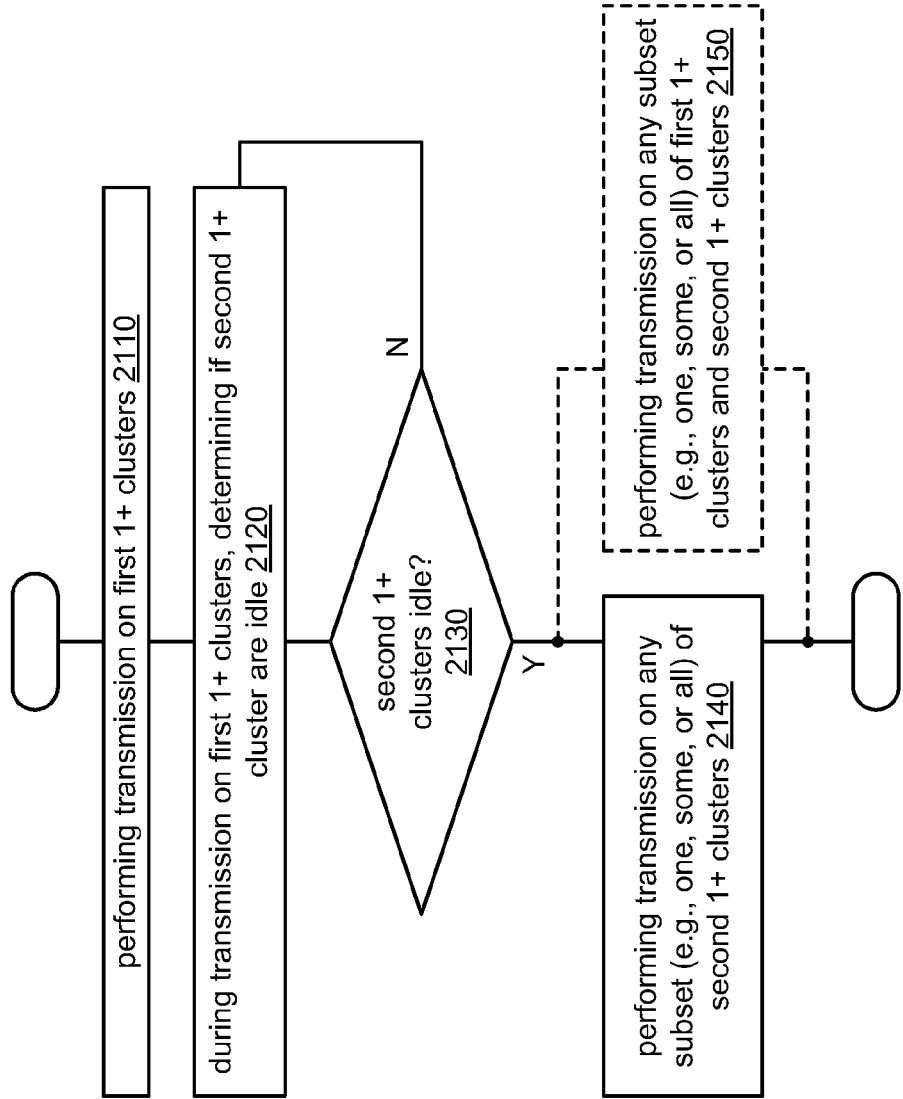

Referring to method 2100 of FIG. 21, the method 2100 begins by performing transmission on a first one or more clusters, as shown in a block 2110. During transmission on the first one or more clusters, the method 2100 continues by determining if a second one or more clusters is idle, as shown in a block 2120. As determined by the decision block 2130, if none of the second one or more clusters is idle, then the method 2100 continues operations in accordance with block 2120.

Alternatively, as determined by the decision block 2130, if the second one or more clusters is idle, then the method 2100 continues operations by performing transmission on any subset (e.g., one, some, or all) of the second one or more clusters, as shown in a block 2140. This may be viewed as performing transmission on not only the first one or more clusters, but adding the second one or more clusters for use in transmission once they become available during the transmission via the first one or more clusters (e.g., after the transmission has begun on the first one or more clusters). For example, the method 2100 may start transmitting on the newly available one or more clusters in addition to the currently used clusters being used for the transmission. In other words, these newly available clusters may be included for use in transmission in addition to the currently used clusters (e.g., in addition to the clusters being used for the current transmission on the initially determined idle clusters).

In alternative embodiments, after proceeding from the decision block 2130, the method 2100 may operate by performing transmission on any subset (e.g., one, some, or all) of both the first one or more clusters and second one or more clusters, as shown in a block 2150.

Figure 22:
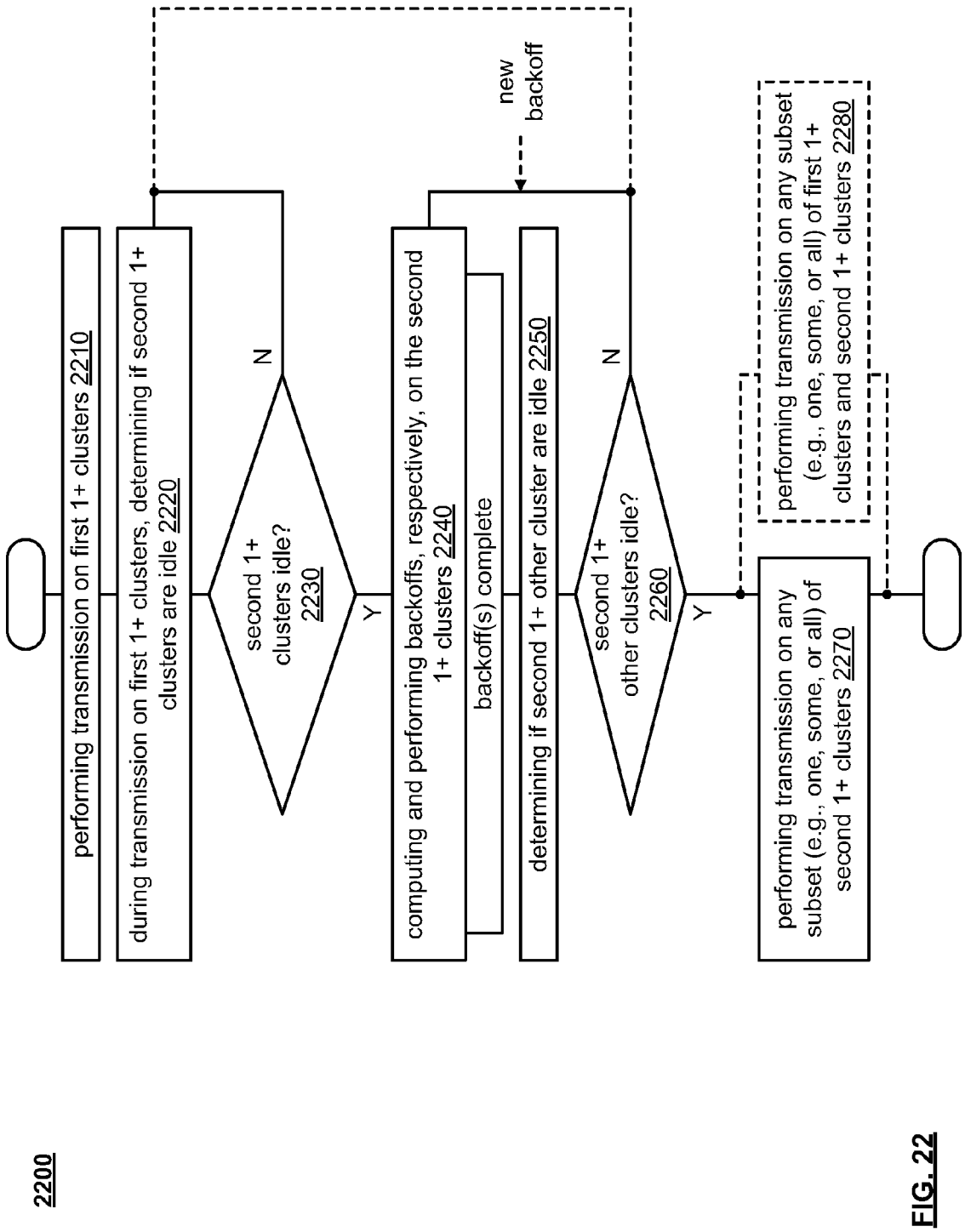

Referring to method 2200 of FIG. 22, the method 2200 begins by performing transmission on a first one or more clusters, as shown in a block 2210. During transmission on the first one or more clusters, the method 2200 continues by determining if a second one or more clusters is idle, as shown in a block 2220. As determined by the decision block 2230, if none of the second one or more clusters is idle, then the method 2200 continues operations in accordance with block 2220. This may involve computing a new backoff start count for use in performing the subsequent backoff.

Alternatively, as determined by the decision block 2230, if the second one or more clusters is idle, then the method 2200 continues operations by computing and performing backoffs, respectively, on the second one or more clusters, as shown in a block 2240. Once the backoff is complete (e.g., count is zero), the method 2200 then operates by determining if the second one or more clusters is idle, as shown in a block 2250.

As determined by a decision block 2260, if none of the second one or more clusters is idle, then the method 2200 continues operations in accordance with block 2220 or block 2240. Alternatively, as determined by the decision block 2230, if the second one or more clusters is idle, then the method 2200 continues operations by performing transmission on any subset (e.g., one, some, or all) of the second one or more clusters, as shown in a block 2270.

In alternative embodiments, after proceeding from the decision block 2260, the method 2200 may operate by performing transmission on any subset (e.g., one, some, or all) of both the first one or more clusters and second one or more clusters, as shown in a block 2280.

Figure 23:
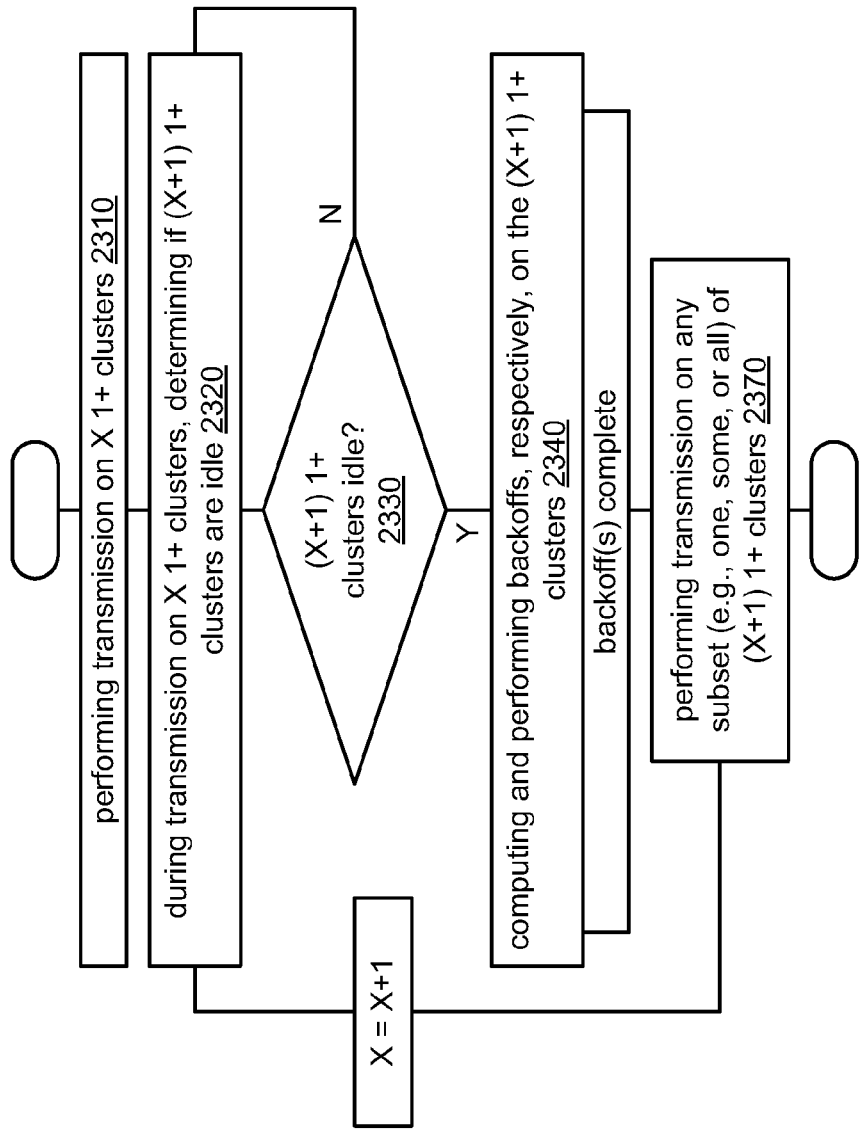

Referring to method 2300 of FIG. 23, the method 2300 begins by performing transmission on a first one or more clusters (shown generally as X one or more clusters), as shown in a block 2310. During transmission on the first one or more clusters, the method 2300 continues by determining if a second one or more clusters (shown generally as X+1 one or more clusters, being a different group than the X one or more clusters) is idle, as shown in a block 2320. As determined by the decision block 2330, if none of the X+1 one or more clusters is idle, then the method 2300 continues operations in accordance with block 2320. This may involve computing a new backoff start count for use in performing the subsequent backoff.

Alternatively, as determined by the decision block 2330, if the second one or more clusters is idle, then the method 2300 continues operations by computing and performing backoffs, respectively, on the second one or more clusters, as shown in a block 2340. Once the backoff is complete (e.g., count is zero), the method 2300 then operates by performing transmission on any subset (e.g., one, some, or all) of the X+1 one or more clusters, as shown in a block 2370.

This process may repeat as many times as desired. For example, X may be incremented, and the process may repeat with respect to yet a third, fourth, etc. one or more clusters.

Figure 24:
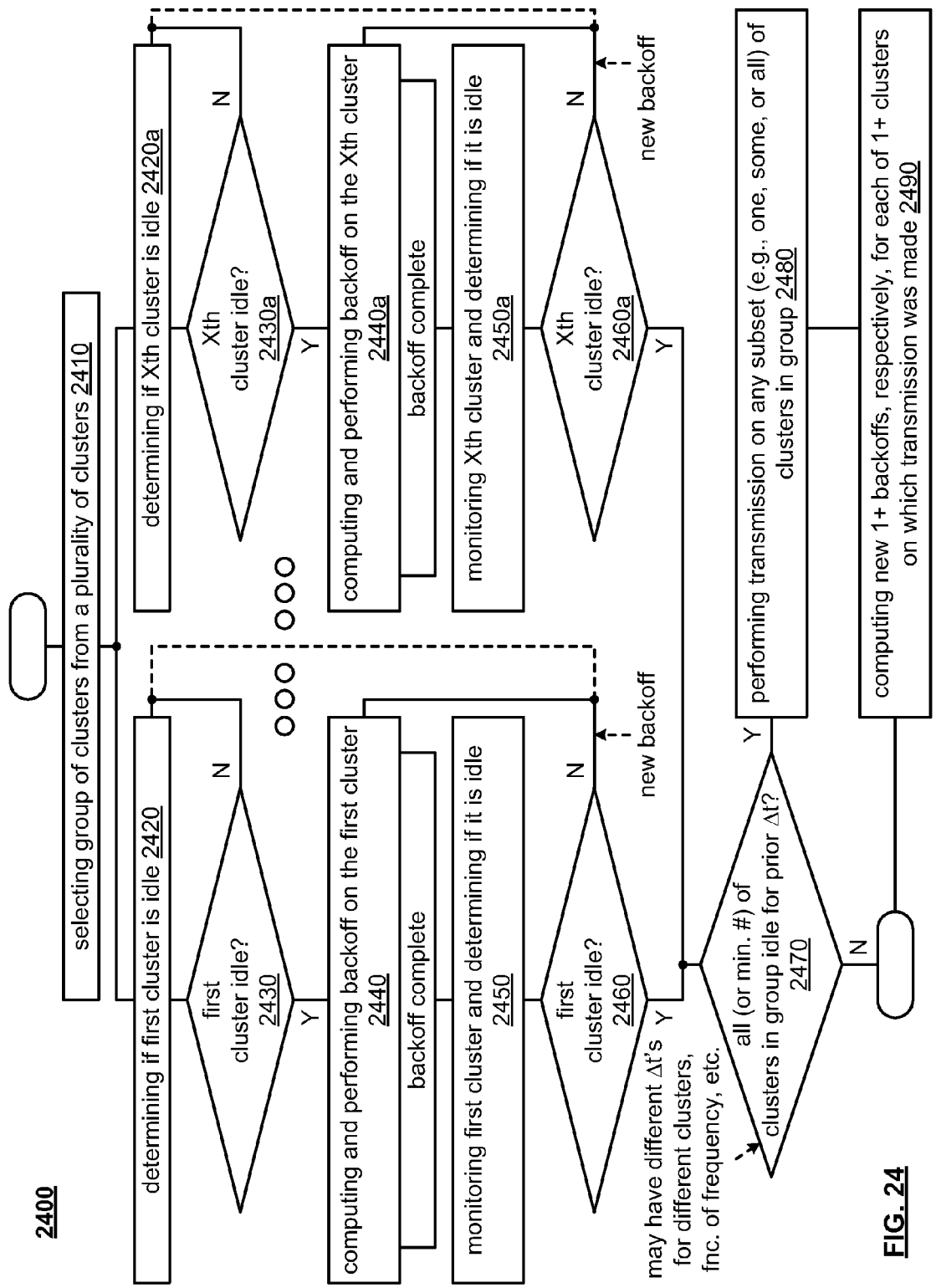

Referring to method 2400 of FIG. 24, the method 2400 begins by selecting group of clusters from a plurality of clusters, as shown in a block 2410. Again, as within other embodiments, this group need not consist of all of the available clusters. The method 2400 continues by determining if a first cluster of the group is idle, as shown in a block 2420. As determined by the decision block 2430, if the first cluster is not idle, then the method 2400 continues operations in accordance with block 2420.

Alternatively, if the first cluster is idle, then the method 2400 continues by computing and performing backoff on the first cluster, as shown in a block 2440. Once the backoff is complete (e.g., count is zero), the method 2400 then operates by monitoring the first cluster to determine if it is still idle, as shown in a block 2450.

As determined by the decision block 2460, if the first cluster is not idle, then the method 2400 continues operations in accordance with block 2420 (e.g., including possibly involving computing a new backoff start count for use in performing the subsequent backoff) or 2440.

In parallel with the operations of the blocks 2420-2460, analogous operations may be performed for additional clusters on which a transmission is desired to be made. Generally, the group of clusters selected in the block 2410 may include X clusters. Operations analogous to those in the blocks 2420-2460 may be performed for each respective cluster within the group of X clusters, as shown generally using blocks the blocks 2420a-2460a with respect to an Xth cluster.

If the decisions from each of the decision blocks 2460 and 2460a (as well as with respect to any other clusters) are in the affirmative, then the method 2400 determines if all or a minimum number of clusters have been idle for requisite period or periods of time.

As determined by the decision block 2460, if all or the minimum number of clusters has been idle for requisite period or periods of time, as shown in a decision block 2490. For example, each of these clusters for which the medium condition is found to be idle must be required to be idle for a period of time (e.g., time D). This period of time, D, may be a predetermined period of time such as a fixed amount of "look-back" time applicable for more than one cluster. Also, different clusters may have different respective "look-back" times (e.g., D1 for cluster 1, D2 for cluster 2, D3 for cluster 3, etc.). Alternatively, D may also have different values depending on the characteristics of the respective cluster, frequency of operation, etc.

If a minimum number of clusters have not been idle for requisite period or periods of time, as shown in a decision block 2490, then the method 2400 continues operations in accordance with block 2440 (may involve calculating a new backoff start count).

Alternatively, if the minimum number of clusters has been idle for requisite period or periods of time, as shown in a decision block 2490, then the method 2400 continues operations by performing transmission on any subset (e.g., one, some, or all) of clusters in the group, as shown in a block 2480. After the transmission is complete, the method 2400 then operates by computing new backoffs, respectively, for each of the one or more clusters on which transmission was made, as shown in a block 2490.

From certain perspectives, the method 2400 is a variation of an embodiment for computing a first backoff start count for performing a first backoff for a first of a plurality of clusters when the first of the plurality of clusters detected as being idle. Then, the operations continue by computing a second backoff start count for performing a second backoff for a second of the plurality of clusters when the second of the plurality of clusters detected as being idle. Then, when the first backoff corresponding to the first of the plurality of clusters being completed, the operations continue by monitoring for any first activity on the first of the plurality of clusters being idle. When the second backoff corresponding to the second of the plurality of clusters being completed, the operations continue by monitoring for any second activity on the second of the plurality of clusters being idle. When the monitoring failing to detect any first activity and any second activity, the operations continue by operating at least one of a plurality of antennae for transmitting at least one signal to at least one additional wireless communication device using the first and the second of the plurality of clusters.

Figure 25:
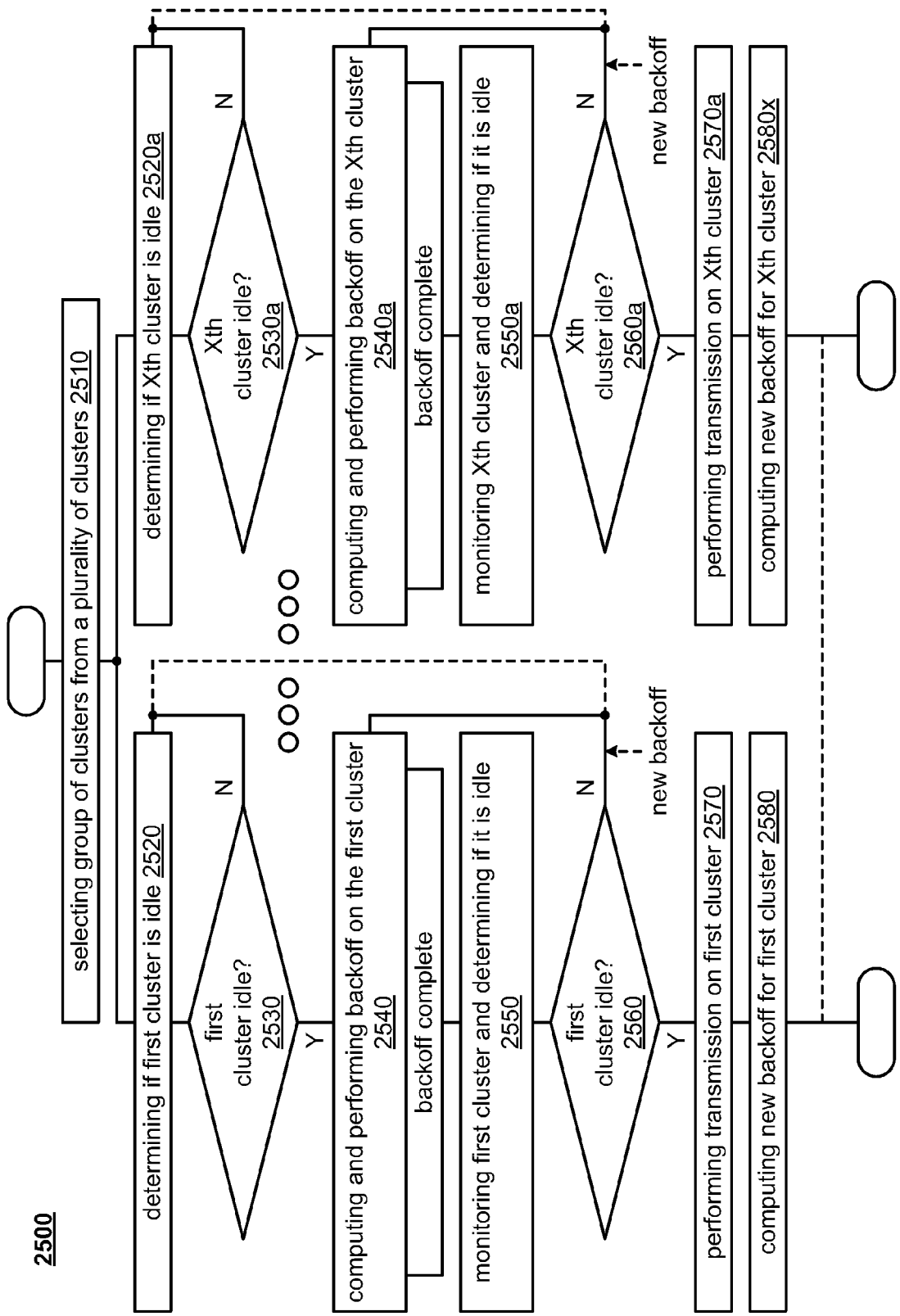

Referring to method 2500 of FIG. 25, the method 2500 begins by selecting group of clusters from a plurality of clusters, as shown in a block 2510. Again, as within other embodiments, this group need not consist of all of the available clusters. The method 2500 continues by determining if a first cluster of the group is idle, as shown in a block 2520. As determined by the decision block 2530, if the first cluster is not idle, then the method 2500 continues operations in accordance with block 2520.

Alternatively, if the first cluster is idle, then the method 2500 continues by computing and performing backoff on the first cluster, as shown in a block 2540. Once the backoff is complete (e.g., count is zero), the method 2500 then operates by monitoring the first cluster to determine if it is still idle, as shown in a block 2550.

As determined by the decision block 2560, if the first cluster is not idle, then the method 2500 continues operations in accordance with block 2520 (e.g., including possibly involving computing a new backoff start count for use in performing the subsequent backoff) or 2540.

Alternatively, as determined by the decision block 2560, if the first cluster is in fact idle, then the method 2500 continues by performing transmission on the first cluster, as shown in a block 2570. After the transmission is complete, the method 2500 then operates by computing a new backoff for the first cluster on which transmission was made, as shown in a block 2580.

In parallel with the operations of the blocks 2520-2580, analogous operations may be performed for additional clusters on which a transmission is desired to be made. Generally, the group of clusters selected in the block 2510 may include X clusters. Operations analogous to those in the blocks 2520-2580 may be performed for each respective cluster within the group of X clusters, as shown generally using blocks the blocks 2520a-2580a with respect to an Xth cluster.

The embodiment of method 2500 may be viewed as treating each respective cluster independently and performing transmission respectively on each respective cluster when that cluster has undergone backoff and is then determined as being idle.

It is noted that the various modules and/or circuitries (e.g., baseband processing modules, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

| | | | | 2.4 GHz, 20/22 MHz channel BW, 54 Mbps max bit rate | | | | | |
|---|---|---|---|---|---|---|---|---|---|
| Rate | Modulation Barker | Code Rate | NBPSC | NCBPS | NDBPS | EVM | Sensitivity | ACR | AACR |
| 1 | BPSK Barker | | | | | | | | |
| 2 | QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |

TABLE 1-continued 2.4 GHz, 20/22 MHz channel BW, 54 Mbps max bit rate

| Rate | Modulation Barker | Code Rate | NBPSC | NCBPS | NDBPS | EVM | Sensitivity | ACR | AACR |
|---|---|---|---|---|---|---|---|---|---|
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1

| Frequency Offset | PSD Mask 1 dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country | Channel | Frequency (MHz) | Country |
|---|---|---|---|---|---|---|---|---|
| 240 | 4920 | Japan | | | | | | |
| 244 | 4940 | Japan | | | | | | |
| 248 | 4960 | Japan | | | | | | |
| 252 | 4980 | Japan | | | | | | |
| 8 | 5040 | Japan | | | | | | |
| 12 | 5060 | Japan | | | | | | |
| 16 | 5080 | Japan | | | | | | |
| 36 | 5180 | USA/Europe | 34 | 5170 | Japan | | | |
| 40 | 5200 | USA/Europe | 38 | 5190 | Japan | | | |
| 44 | 5220 | USA/Europe | 42 | 5210 | Japan | | | |
| 48 | 5240 | USA/Europe | 46 | 5230 | Japan | | | |
| 52 | 5260 | USA/Europe | | | | | | |
| 56 | 5280 | USA/Europe | | | | | | |
| 60 | 5300 | USA/Europe | | | | | | |
| 64 | 5320 | USA/Europe | | | | | | |
| 100 | 5500 | USA/Europe | | | | | | |
| 104 | 5520 | USA/Europe | | | | | | |
| 108 | 5540 | USA/Europe | | | | | | |
| 112 | 5560 | USA/Europe | | | | | | |
| 116 | 5580 | USA/Europe | | | | | | |
| 120 | 5600 | USA/Europe | | | | | | |
| 124 | 5620 | USA/Europe | | | | | | |
| 128 | 5640 | USA/Europe | | | | | | |
| 132 | 5660 | USA/Europe | | | | | | |
| 136 | 5680 | USA/Europe | | | | | | |
| 140 | 5700 | USA/Europe | | | | | | |
| 149 | 5745 | USA | | | | | | |
| 153 | 5765 | USA | | | | | | |
| 157 | 5785 | USA | | | | | | |
| 161 | 5805 | USA | | | | | | |
| 165 | 5825 | USA | | | | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |

TABLE 9-continued channelization for Table 8

| Channel | Frequency (MHz) | Country | Channel | Frequency (MHz) | Country |
|---|---|---|---|---|---|
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10

| Frequency Offset | PSD Mask 2 dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for execution by a wireless communication device, the method comprising:
computing a first backoff start count to perform a first backoff for a first of a plurality of clusters that is a primary cluster employed for all wireless signaling within a carrier sense multiple access/collision avoidance (CSMA/CA) communication system that includes the wireless communication device when the primary cluster is detected as being idle;
when the first backoff is completed after a countdown from the first backoff start count reaches zero, computing a second backoff start count to perform a second backoff for the plurality of clusters and determining whether the plurality of clusters are idle, wherein the plurality of clusters being a plurality of mappings of orthogonal frequency division multiplexing (OFDM) tones within a corresponding at least one channel among a corresponding at least one frequency band;
after completion of the second backoff and when the plurality of clusters is idle, via a communication interface of the wireless communication device, transmitting at least one signal to at least one additional wireless communication device using at least one of the first and a second of the plurality of clusters; and
when the first and the second of the plurality of clusters is idle for a predetermined amount of time, via the communication interface of the wireless communication device, transmitting the at least one signal or at least one additional signal to at least one additional wireless communication device using at least one of the first and the second of the plurality of clusters.

2. The method of claim 1 further comprising:
computing a plurality of backoff start counts for each respective cluster of the plurality of clusters such that each respective one of the plurality of backoff start counts corresponds to a respective one of the plurality of clusters;
for each respective cluster of the plurality of clusters, when a respective backoff corresponding to respective cluster is completed after a corresponding countdown from the respective backoff start count reaches zero, determining whether the respective cluster is idle; and
for each respective cluster of the plurality of clusters, when the respective cluster determined is idle, transmitting the at least one signal or at least one additional signal to the at least one additional wireless communication device using the respective cluster.

3. The method of claim 1, wherein the wireless communication device is a first wireless station (STA), and the at least one additional wireless communication device is a second STA.

4. The method of claim 1 further comprising:
when the first of the plurality of clusters is idle for a first predetermined amount of time, transmitting the at least one signal to at least one additional wireless communication device using the first of the plurality of clusters; and
when the second of the plurality of clusters is idle for a second predetermined amount of time, transmitting the at least one signal or at least one additional signal to the at least one additional wireless communication device using the second of the plurality of clusters.

5. The method of claim 1 further comprising:
while transmitting the at least one signal to the at least one additional wireless communication device using the at least one of the first and the second of the plurality of clusters, determining whether a third of the plurality of clusters is idle; and
when the third of the plurality of clusters is idle, transmitting the at least one signal or at least one additional signal to the at least one additional wireless communication device using at least one of the first, the second, and the third of the plurality of clusters.

6. The method of claim 1 further comprising:
after transmitting the at least one signal, computing at least one additional backoff start count for the first of the plurality of clusters to perform subsequent backoff.

7. The method of claim 1 further comprising:
operating a subset or all of a plurality of antennae of the communication interface to transmit a plurality of signals, respectively, to a plurality of additional wireless communication devices using a subset or all of the plurality of clusters.

8. The method of claim 1, wherein the at least one signal is a multiple input multiple output (MU-MIMO) frame or an orthogonal frequency division multiple access (OFDMA) frame.

9. The method of claim 1, wherein the wireless communication device is an access point (AP), and the at least one additional wireless communication device is a wireless station (STA).

10. A method for execution by a wireless communication device, the method comprising:
computing a first backoff start count to perform a first backoff for a first of a plurality of clusters that is a primary cluster employed for all wireless signaling within a carrier sense multiple access/collision avoidance (CSMA/CA) communication system including the wireless communication device when the primary cluster is detected as being idle;
computing a second backoff start count to perform a second backoff for the plurality of clusters when the plurality of clusters is detected as being idle after completion of the first backoff, wherein the plurality of clusters being a plurality of mappings of orthogonal frequency division multiplexing (OFDM) tones within a corresponding at least one channel among a corresponding at least one frequency band;
when the first backoff corresponding to the primary cluster is completed after a first countdown from the first backoff start count reaches zero, monitoring for any first activity on the primary cluster;
when the second backoff corresponding to the plurality of clusters is completed after a second countdown from the second backoff start count reaches zero, monitoring for any second activity on the plurality of clusters; and
when the monitoring fails to detect any first activity and any second activity for a predetermined period of time, via a communication interface of the wireless communication device, transmitting at least one signal to at least one additional wireless communication device using the first and a second of the plurality of clusters.

11. The method of claim 10, wherein the wireless communication device is a first wireless station (STA), and the at least one additional wireless communication device is a second STA.

12. The method of claim 10 further comprising:
operating a subset or all of a plurality of antennae of the communication interface to transmit a plurality of signals, respectively, to a plurality of additional wireless communication devices using a subset or all of the plurality of clusters.

13. The method of claim 10 further comprising:
after transmitting the at least one signal, computing at least one additional backoff start count for the first of the plurality of clusters to perform subsequent backoff.

14. The method of claim 10, wherein the at least one signal is a multiple input multiple output (MU-MIMO) frame or an orthogonal frequency division multiple access (OFDMA) frame.

15. The method of claim 10, wherein the wireless communication device is an access point (AP), and the at least one additional wireless communication device is a wireless station (STA).

16. An apparatus comprising:
a processor configured to:
compute a first backoff start count to perform a first backoff for a first of a plurality of clusters that is a primary cluster employed for all wireless signaling within a carrier sense multiple access/collision avoidance (CSMA/CA) communication system including the apparatus when the primary cluster is detected as being idle; and
when the first backoff is completed after a countdown from the first backoff start count reaches zero, compute a second backoff start count to perform a second backoff for the plurality of clusters and determine whether the plurality of clusters are idle, wherein the plurality of clusters being a plurality of mappings of orthogonal frequency division multiplexing (OFDM) tones within a corresponding at least one channel among a corresponding at least one frequency band; and
a communication interface configured to:
transmit, after completion of the second backoff and when the plurality of clusters is idle, transmit at least one signal to at least one wireless communication device using at least one of the first and a second of the plurality of clusters; and
when the first and the second of the plurality of clusters is idle for a predetermined amount of time, transmit the at least one signal or at least one additional signal to at least one additional wireless communication device using at least one of the first and the second of the plurality of clusters.

17. The apparatus of claim 16, wherein the processor is further configured to:
compute a plurality of backoff start counts for each respective cluster of the plurality of clusters such that each respective one of the plurality of backoff start counts corresponds to a respective one of the plurality of clusters;
for each respective cluster of the plurality of clusters, when a respective backoff corresponding to respective cluster being completed after a corresponding countdown from the respective backoff start count reaches zero, determine whether the respective cluster being idle; and for each respective cluster of the plurality of clusters, when the respective cluster determined as being idle, direct the communication interface to transmit the at least one signal or at least one additional signal to the at least one additional wireless communication device using the respective cluster.

18. The apparatus of claim 16, wherein the processor is further configured to:

compute at least one additional backoff start count for the first of the plurality of clusters for performing subsequent backoff after the at least one signal being transmitted.

19. The apparatus of claim 16, wherein the at least one signal is a multiple input multiple output (MU-MIMO) frame or an orthogonal frequency division multiple access (OFDMA) frame.

20. The apparatus of claim 16 further comprising:

an access point (AP), wherein the at least one additional wireless communication device is a wireless station (STA).

* * * * *